United States Patent
Tokunaga et al.

(10) Patent No.: US 9,001,188 B2
(45) Date of Patent: Apr. 7, 2015

(54) INFORMATION PROCESSING APPARATUS, INFORMATION PROCESSING METHOD AND PROGRAM

(75) Inventors: Ryuji Tokunaga, Tokyo (JP); Hiroyuki Fukuchi, Kanagawa (JP); Nobutoshi Shida, Tokyo (JP); Toshiyuki Yamauchi, Tokyo (JP)

(73) Assignee: Sony Corporation, Tokyo (JP)

( * ) Notice: Subject to any disclaimer, the term of this patent is extended or adjusted under 35 U.S.C. 154(b) by 313 days.

(21) Appl. No.: 13/137,676

(22) Filed: Sep. 2, 2011

(65) Prior Publication Data

US 2012/0092448 A1 Apr. 19, 2012

(30) Foreign Application Priority Data

Oct. 15, 2010 (JP) ................. 2010-232804

(51) Int. Cl.
*H04N 13/00* (2006.01)
*G06T 15/00* (2011.01)
*G06T 7/00* (2006.01)

(52) U.S. Cl.
CPC .......... *H04N 13/0059* (2013.01); *G06T 7/0022* (2013.01); *H04N 13/0048* (2013.01); *G06T 7/0075* (2013.01); *G06T 2207/10021* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 5,179,441 A | 1/1993 | Anderson et al. | |
| 5,383,013 A | 1/1995 | Cox | |
| 6,314,211 B1* | 11/2001 | Kim et al. | 382/285 |
| 8,705,844 B2* | 4/2014 | Lee et al. | 382/154 |
| 2001/0045979 A1 | 11/2001 | Matsumoto et al. | |
| 2002/0012459 A1 | 1/2002 | Oh | |
| 2007/0047040 A1 | 3/2007 | Ha | |
| 2008/0215184 A1* | 9/2008 | Choi et al. | 700/259 |
| 2010/0166338 A1* | 7/2010 | Lee et al. | 382/285 |
| 2010/0245548 A1* | 9/2010 | Sasaki et al. | 348/51 |
| 2010/0289882 A1* | 11/2010 | Ohta | 348/51 |
| 2011/0018976 A1* | 1/2011 | Park | 348/51 |
| 2011/0026834 A1* | 2/2011 | Hirasawa | 382/203 |

FOREIGN PATENT DOCUMENTS

| | | |
|---|---|---|
| EP | 1286307 A2 | 2/2003 |
| JP | 09-322198 A | 12/1997 |
| WO | WO-2005/114998 A1 | 12/2005 |

(Continued)

OTHER PUBLICATIONS

Zheng, Zi-Wei et al., "Novel Synchronization for TDS-OFDM-Based Digital Television Terrestrial Broadcast Systems" IEEE Transactions on Broadcasting vol., 50, No. 2 Jun. 2004.
Ming, Liu et al., "A Combined Time and Frequency Algorithm for Improved Channel Estimation in TDS-OFDM", IEEE ICC 2010 Proceeding.
He, Dazhi et al., "Error Rotated Decision Feed Back Equalizer for Chinese DTTB Receiver".

(Continued)

*Primary Examiner* — Christopher S Kelley
*Assistant Examiner* — Kaitlin A Retallick
(74) *Attorney, Agent, or Firm* — Sony Corporation

(57) ABSTRACT

Disclosed herein is an information processing apparatus, including: an acquisition section adapted to acquire stereoscopic image information for displaying a stereoscopic image; and a production section adapted to compare a first image and a second image, which configure the acquired stereoscopic image information, with each other to produce a parameter indicative of a position of a body included in the stereoscopic image in the depthwise direction when the stereoscopic image is displayed.

18 Claims, 15 Drawing Sheets

(56) References Cited

FOREIGN PATENT DOCUMENTS

| WO | WO-2006/003611 | A2 | 1/2006 |
| WO | WO-2007/020570 | A2 | 2/2007 |
| WO | WO-2008/153294 | A2 | 12/2008 |
| WO | WO-2010/075346 | A1 | 7/2010 |
| WO | WO-2010/095443 | A1 | 8/2010 |

OTHER PUBLICATIONS

Extended European Search Report issue Apr. 17, 2012 for corresponding European Application No. 11 18 0921.
Partial European Search Report issued Feb. 6, 2012 for corresponding European Application No. 11 18 0921.

* cited by examiner

FIG.5A
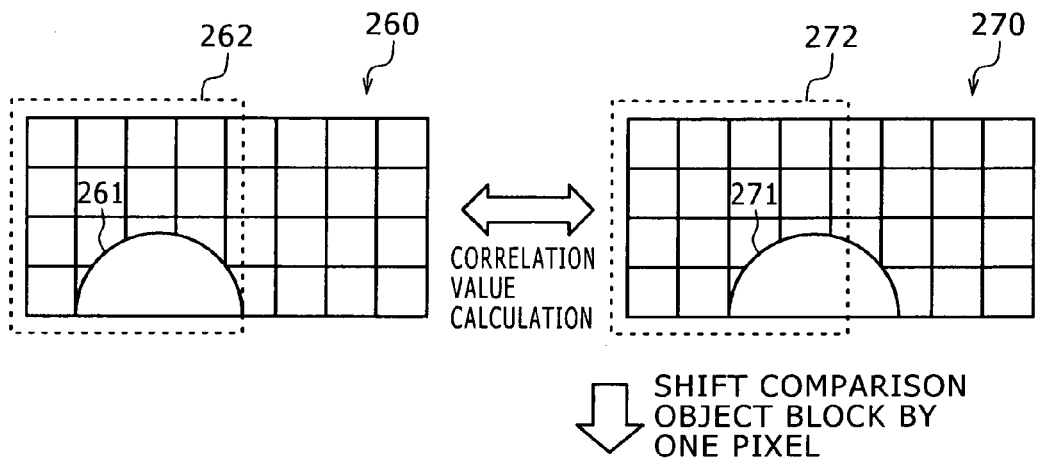
SHIFT COMPARISON OBJECT BLOCK BY ONE PIXEL
FIG.5B
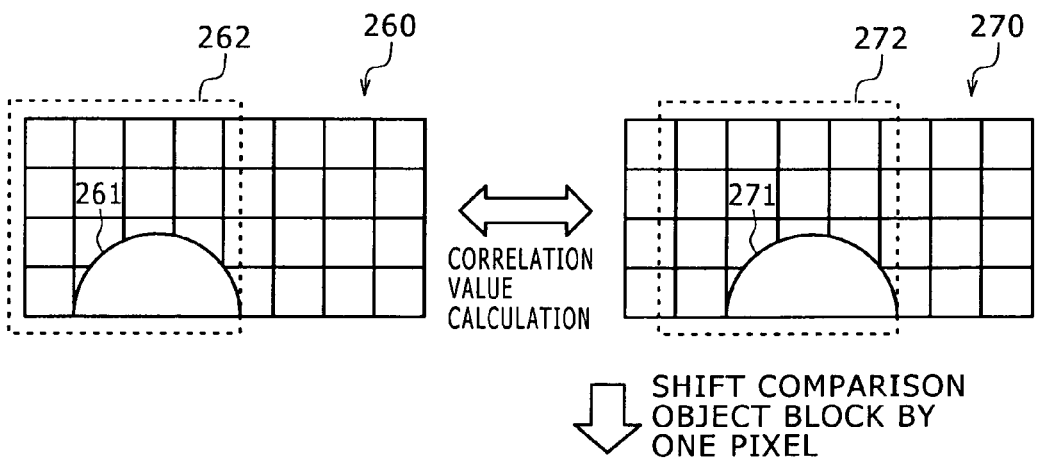
SHIFT COMPARISON OBJECT BLOCK BY ONE PIXEL
FIG.5C
⋮
CALCULATE DISPLACEMENT AMOUNT BASED ON COMPARISON OBJECT BLOCK WHICH EXHIBITS MAXIMUM CORRELATION VALUE

FIG.6A
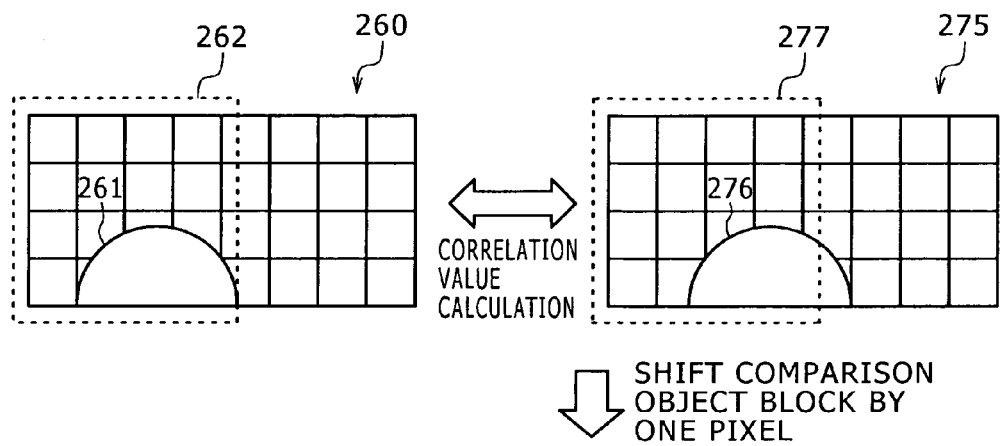
FIG.6B
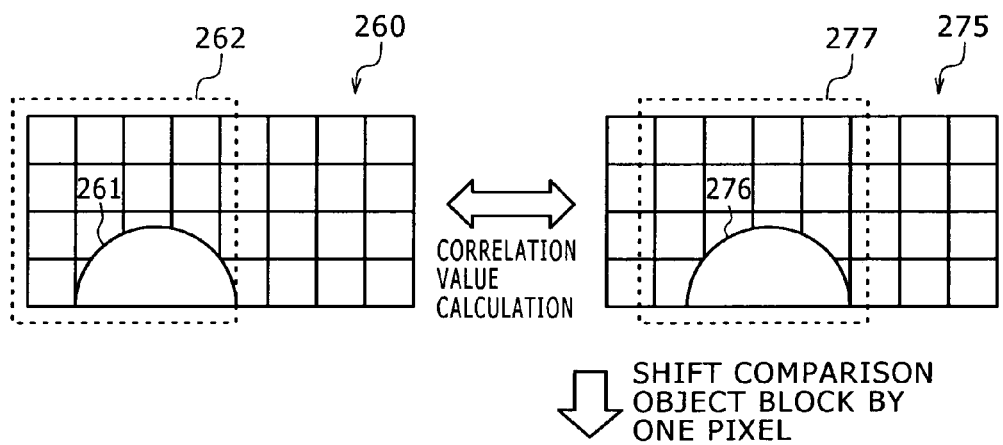
FIG.6C
⋮
CALCULATE DISPLACEMENT AMOUNT BASED ON COMPARISON OBJECT BLOCK WHICH EXHIBITS MAXIMUM CORRELATION VALUE

DETERMINE DISPLACEMENT AMOUNT FOR EACH COMPARISON OBJECT BLOCK

INFORMATION PROCESSING APPARATUS, INFORMATION PROCESSING METHOD AND PROGRAM

BACKGROUND

This disclosure relates to an information processing apparatus, and more particularly to an information processing apparatus and an information processing method in which information for displaying a stereoscopic image is handled and a program for causing a computer to execute the method.

A great number of stereoscopic image displaying methods for displaying a stereoscopic image which can provide a stereoscopic vision making use of a parallax between the left and right eyes have been proposed. The stereoscopic image is a 3D image and is, for example, a two-eye point image formed from a left eye image and a right eye image. Further, in recent years, thanks to improvement in quality of a stereoscopic image content or 3D content utilizing a computer, display of a stereoscopic image in a theater or the like has been and is increasing, and the interest of viewers is increasing.

Further, together with digitization of television broadcasting, it becomes possible to transmit digital data of an amount which have not been transmitted by analog broadcasting in the past. Therefore, it is expected that digital data for displaying a stereoscopic image are transmitted to television receivers for home use by digital broadcasting so that a stereoscopic image can be frequently displayed on a television receiver for home use. Therefore, it is considered that the interest in a stereoscopic image further increases.

For example, as an apparatus which displays a stereoscopic image, a stereoscopic image displaying television apparatus has been proposed on which a user can watch an image which exhibits a stereoscopic effect if the user wears shutter glasses to watch the image. A television apparatus of the type described is disclosed, for example, in Japanese Patent Laid-Open No. Hei 09-322198, particularly in FIG. 2.

SUMMARY

The television apparatus of the document referred to above can display a stereoscopic image appropriately.

However, when a stereoscopic image is watched, a user sometimes wants to have a stereoscopic image to be displayed in conformity with the liking thereof independently of a depth amount of a body set in advance. For example, it may be considered preferable to a user of a comparatively advanced age that the projecting degree of a body is not very high. In contrast, also it is considered that a comparatively young user may want to enjoy a comparatively intense motion.

In this manner, even in the case where the same stereoscopic image is watched, different users who watch the stereoscopic image have various likings, and therefore, it is significant to display a stereoscopic image in accordance with the liking of each user. To this end, it is significant to produce a parameter, which is used when a stereoscopic image conforming to the liking of a user is to be displayed, before the stereoscopic image is displayed and allow the produced parameter to be used appropriately in conformity with the liking of the user.

Therefore, it is desirable to provide an information processing apparatus, an information processing method and a program by which a parameter for displaying a stereoscopic image conforming to the liking of a user can be produced appropriately.

According to a first embodiment of the disclosed technology, there is provided an information processing apparatus including an acquisition section adapted to acquire stereoscopic image information for displaying a stereoscopic image, and a production section adapted to compare a first image and a second image, which configure the acquired stereoscopic image information, with each other to produce a parameter indicative of a position of a body included in the stereoscopic image in the depthwise direction when the stereoscopic image is displayed.

Further, according to the first embodiment, there are provided also an information processing method including, and a program for causing a computer to execute, acquiring stereoscopic image information for displaying a stereoscopic image, and comparing a first image and a second image, which configure the acquired stereoscopic image information, with each other to produce a parameter indicative of a position of a body included in the stereoscopic image in the depthwise direction when the stereoscopic image is displayed.

In the information processing apparatus, information processing method and program, a first image and a second image which configure stereoscopic image information are compared with each other to produce a parameter indicative of a position of a body included in a stereoscopic image in the depthwise direction when the stereoscopic image is displayed.

The information processing apparatus may be configured such that the production section compares the first image and the second image with each other to calculate a displacement amount of the body included in the first image and the second image between the images and produces, based on the displacement amount, the parameter which associates a region of the body and the depth amount of the body with each other. In the information processing apparatus, a displacement amount of a body included in the first image and the second image between the images is calculated, and a parameter which associates a region of the body and the depth amount of the body with each other is produced based on the displacement amount.

In this instance, the production section may calculate, as the depth amount of the body, a protruding amount or a receding amount of the body in the case where a display face of a display section which displays the stereoscopic image is determined as a reference. In the information processing apparatus, a protruding amount or a receding amount of the body in the case where the display face of the display section which displays the stereoscopic image is determined as a reference is calculated.

Or, the production section may detect one or a plurality of bodies included in the first image and the second image for each body, the information processing apparatus further including a recording control section adapted to record the parameter, which associates the region of each of the detected bodies and the depth amount of the body with each other, into or on a recording medium. In the information processing apparatus, one or a plurality of bodies included in the first image and the second image are detected for each body, and a region of each detected body and the depth amount of the body are recorded in an associated relationship with each other into or on a recording medium.

The information processing apparatus may be configured such that the production section compares a block which configures the first image and a block which configures the second image with each other to calculate a displacement amount of the body included in the first image and the second image in a unit of a block and produces table information which retains the calculated displacement amount in a unit of a block. In the information processing apparatus, a displacement amount of a body included in the first image and the second image is calculated in a unit of a block, and table information which retains the calculated displacement amount in a unit of a block is produced.

The acquisition section may receive a broadcasting wave and acquire video data which correspond to the broadcasting wave for displaying the stereoscopic image as the stereoscopic image information. In the information processing apparatus, a broadcasting wave is received to acquire video data corresponding to the broadcasting wave, which are video data for displaying a stereoscopic image.

In this instance, the information processing apparatus may be configured such that the acquisition section acquires, as the stereoscopic image information, video data of the frame packing system which is a transmission system wherein the first image and the second image which are in a compression coded form are transmitted successively on a time axis in a unit of a pair and a motion vector between the first image and the second image is associated with the images, and the production section produces the parameter using a horizontal component of the motion vector. In the information processing apparatus, video data of the frame packing system are acquired, and a horizontal component of a motion vector between the first image and the second image is used to produce a parameter.

The production section may produce, as the parameter, a parameter to be used when the position of the body in the depthwise direction is adjusted. In the information processing apparatus, a parameter which is used when the position of the body in the depthwise direction is adjusted is produced.

Or, the production section may produce, as the parameter, a parameter to be used when sound to be emitted from the body is adjusted. In the information processing apparatus, a parameter which is used when sound to be emitted from the body is adjusted is produced.

The information processing apparatus may further include a recording control section adapted to cause the produced parameter and the acquired stereoscopic image information to be recorded in an associated relationship with each other on or into a recording medium. In the information processing apparatus, the produced parameter and the acquired stereoscopic image information are recorded in an associated relationship with each other on or into a recording medium.

According to a second embodiment of the disclosed technology, there is provided an information processing apparatus including an acquisition section adapted to acquire video data including a first image and a second image for displaying a stereoscopic image, the video data being of the frame packing system which is a transmission system wherein the first images and the second images both in a coded form are transmitted successively on a time axis in a unit of a pair and a motion vector between the first image and the second image is associated with the images, and a production section adapted to produce, when the motion vector between the first image and the second image included in the acquired image data is used to display the stereoscopic image, a parameter indicative of a position of a body included in the stereoscopic image in the depthwise direction. Also the information processing apparatus can be implemented as an information processing method and a program similarly to the information processing apparatus according to the first embodiment. In the information processing apparatus, video data of the frame packing system are acquired, and a motion vector between a first image and a second image included in the video data is used to produce a parameter indicative of the position of a body included in a stereoscopic image in the depthwise direction when the stereoscopic image is displayed.

In summary, with the information processing apparatus, information processing method and program, a parameter for displaying a stereoscopic image conforming to the liking of a user can be produced appropriately.

The above and other features and advantages of the disclosed technology will become apparent from the following description and the appended claims, taken in conjunction with the accompanying drawings in which like parts or elements denoted by like reference characters.

BRIEF DESCRIPTION OF THE DRAWINGS

FIGS. 5A to 5C are views schematically illustrating a selection method of a block to be used as an object of a correlation value calculation process by the correlation value calculation section and a comparison process of the block;

FIGS. 6A to 6C are views showing part of two images which configure a stereoscopic image to be used as an object of a correlation value calculation process by the correlation value calculation section;

DETAILED DESCRIPTION OF THE PREFERRED EMBODIMENTS

In the following, preferred embodiments of the disclosed technology are described with reference to the accompanying drawings. The description is given in the following order.
1. First Embodiment (stereoscopic image parameter production control: example wherein a stereoscopic image parameter is produced with regard to a stereoscopic image included in a broadcasting wave received from a broadcasting station)
2. Second Embodiment (stereoscopic image parameter recording control: example wherein a stereoscopic image parameter is produced and recorded with regard to a stereoscopic image included in a broadcasting wave received from a broadcasting station)
3. Third Embodiment (stereoscopic image parameter production control: example wherein a stereoscopic image parameter is produced with regard to a stereoscopic image in a compression coded form in accordance with a frame packing system)

Figure 1:
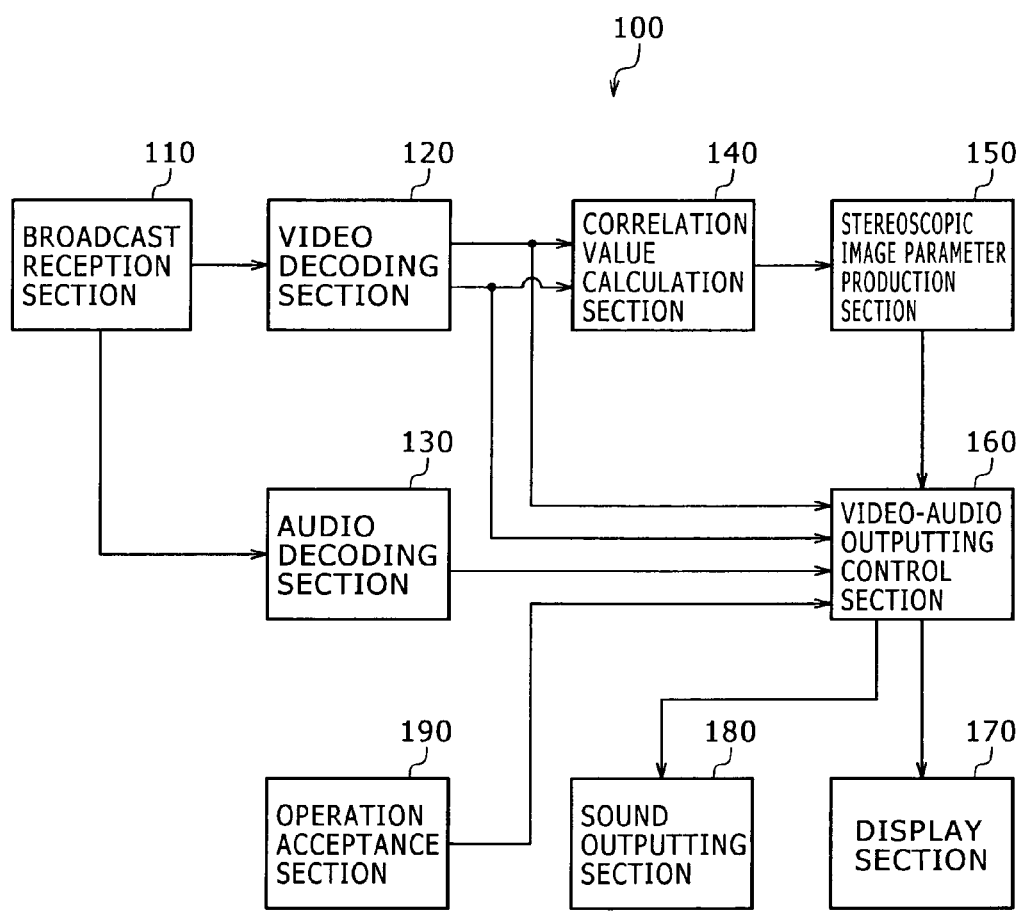
FIG. 1 is a block diagram showing an example of a functional configuration of an information processing apparatus according to a first embodiment of the disclosed technology.

<1. First Embodiment>
Example of the Configuration of an Information Processing Apparatus FIG. 1 shows an example of a functional configuration of an information processing apparatus 100 according to a first embodiment of the present disclosure. Referring to FIG. 1, the information processing apparatus 100 shown includes a broadcast reception section 110, a video decoding section 120, an audio decoding section 130, a correlation value calculation section 140, a stereoscopic image parameter production section 150, a video-audio outputting control section 160, a display section 170, a sound outputting section 180, and an operation acceptance section 190. The information processing apparatus 100 is implemented, for example, by a television receiver which receives broadcasting waves from broadcasting stations and displays an image which may be a stereoscopic image or a planar image.

The broadcast reception section 110 receives broadcasting waves from broadcasting stations through an antenna not shown and demodulates an image or video signal and a sound or audio signal. The broadcast reception section 110 receives broadcasting waves of, for example, ground wave digital television broadcasting, CS (Communications Satellite) digital broadcasting, BS (Broadcasting Satellite) digital broadcasting and so forth. Then, the broadcast reception section 110 outputs a demodulated video signal to the video decoding section 120 and outputs a demodulated audio signal to the audio decoding section 130.

The video decoding section 120 carries out a decoding process for the video signal outputted from the broadcast reception section 110, that is, a video signal in a compression coded form for transmission, to reproduce video data and outputs the reproduced video data to the correlation value calculation section 140 and the video-audio outputting control section 160. If the video signal from the broadcast reception section 110 is a video signal for displaying a stereoscopic image, then the video decoding section 120 successively outputs left eye image data, that is, Lch (left channel) image data, and right eye image data, that is, Rch (right channel) image data, as the reproduced video data. In particular, the broadcast reception section 110 and the video decoding section 120 receive a broadcasting wave to acquire video data corresponding to the broadcasting wave, that is, video data for displaying a stereoscopic image, as stereoscopic image information. The broadcast reception section 110 and the video decoding section 120 are an example of the acquisition section.

The audio decoding section 130 carries out a decoding processing for the audio signal outputted from the broadcast reception section 110, that is, an audio signal in a compression coded formed for transmission, to reproduce audio data, and outputs the reproduced audio data to the video-audio outputting control section 160.

The correlation value calculation section 140 carries out a correlation value calculation process with regard to video data outputted from the video decoding section 120, that is, with regard to a left eye image and a right eye image, and outputs a result of the calculation, that is, a correlation value, to the stereoscopic image parameter production section 150. For example, the correlation value calculation section 140 compares a block which configures the left eye image and a block which configures the right eye image with each other to calculate a correlation between the blocks in a unit of a block. It is to be noted that the correlation value calculation process is hereinafter described in detail with reference to FIGS. 4 to 6C.

The stereoscopic image parameter production section 150 produces, based on the correlation value calculation result outputted from the correlation value calculation section 140, various parameters with regard to the stereoscopic image of the object of the calculation, that is, stereoscopic image parameters. For example, the stereoscopic image parameter production section 150 calculates a displacement amount of a body included in the left eye image and the right eye image and calculates, based on the displacement amount, a stereoscopic image parameter which associates a region of the body and a depth amount of the body. In this instance, the stereoscopic image parameter production section 150 calculates, based on the correlation value calculated in a unit of a block by the correlation value calculation section 140, a displacement amount of a body included in the left eye image and the right eye image in a unit of a block. Then, the stereoscopic image parameter production section 150 produces a displacement amount retaining table or table information which retains the calculated displacement amount in a unit of a block. Here, the depth amount of the body can be provided, for example, when a stereoscopic image is to be displayed on the display section 170, as a projecting amount or a receding amount of the body in the case where the display face of the display section 170 is determined as a reference. In this manner, when a stereoscopic image is displayed, the stereoscopic image parameter production section 150 produces a stereoscopic image parameter, for example, a displacement amount retaining table, representative of a position in the depthwise direction of the body included in the stereoscopic image. This stereoscopic image parameter is used when the position in the depthwise direction of the body included in the stereoscopic image when the stereoscopic image is displayed is to be adjusted. Further, the stereoscopic image parameter is used when sound to be emitted from the body included in the stereoscopic image when the stereoscopic image is displayed is to be adjusted. Then, the stereoscopic image parameter production section 150 outputs the produced stereoscopic image parameters to the video-audio outputting control section 160. It is to be noted that the stereoscopic image parameter production process is hereinafter described in detail with reference to FIGS. 7A to 9C and so forth. Further, the correlation value calculation section 140 and the stereoscopic image parameter production section 150 are an example of the production section.

The video-audio outputting control section 160 carries out an outputting process for outputting an image and sound corresponding to a broadcasting wave received by the broadcast reception section 110 in response to an operation input accepted by the operation acceptance section 190. For example, a case is assumed wherein an operation input for causing the display section 170 to display a stereoscopic image corresponding to a broadcasting wave received by the broadcast reception section 110 and causing the sound outputting section 180 to output sound corresponding to the broadcasting wave is accepted by the operation acceptance section 190. In this instance, the video-audio outputting control section 160 carries out control of the display section 170 to display a stereoscopic image based on video data outputted from the video decoding section 120. Further, the video-audio outputting control section 160 carries out control of the sound outputting section 180 to output sound based on audio data outputted from the audio decoding section 130. Further, a case is assumed wherein an instruction operation for carrying out editing, working and so forth for a stereoscopic image displayed on the display section 170 is accepted by the operation acceptance section 190. In this instance, the video-audio outputting control section 160 uses a stereoscopic image parameter produced by the stereoscopic image parameter production section 150 to carry out editing, working and so forth in accordance with the instruction operation. Further, a case is assumed wherein an instruction operation for adjusting sound to be outputted from the sound outputting section 180 is accepted by the operation acceptance section 190. In this instance, the video-audio outputting control section 160 uses a stereoscopic image parameter produced by the stereoscopic image parameter production section 150 to adjust the sound relating to the stereoscopic image.

The display section 170 displays various images under the control of the video-audio outputting control section 160. The display section 170 can be implemented using a display device such as, for example, an LCD (Liquid Crystal Display) panel.

The sound outputting section 180 outputs various kinds of sound information under the control of the video-audio outputting control section 160. The sound outputting section 180 can be implemented using, for example, a speaker.

The operation acceptance section 190 accepts an operation input by a user and supplies an operation signal in accordance with the substance of the accepted operation input to the video-audio outputting control section 160. For example, if an operation input for causing a stereoscopic image corresponding to a broadcasting wave received by the broadcast reception section 110 to be displayed on the display section 170 and causing corresponding sound to be outputted from the sound outputting section 180 is accepted, then the operation acceptance section 190 supplies the operation signal representative of the operation input to the video-audio outputting control section 160. Further, if an instruction operation for causing a stereoscopic image displayed on the display section 170 to be subjected to editing, working and so forth is carried out, then the operation acceptance section 190 supplies an operation signal representative of the instruction operation to the video-audio outputting control section 160.

Figure 2A:
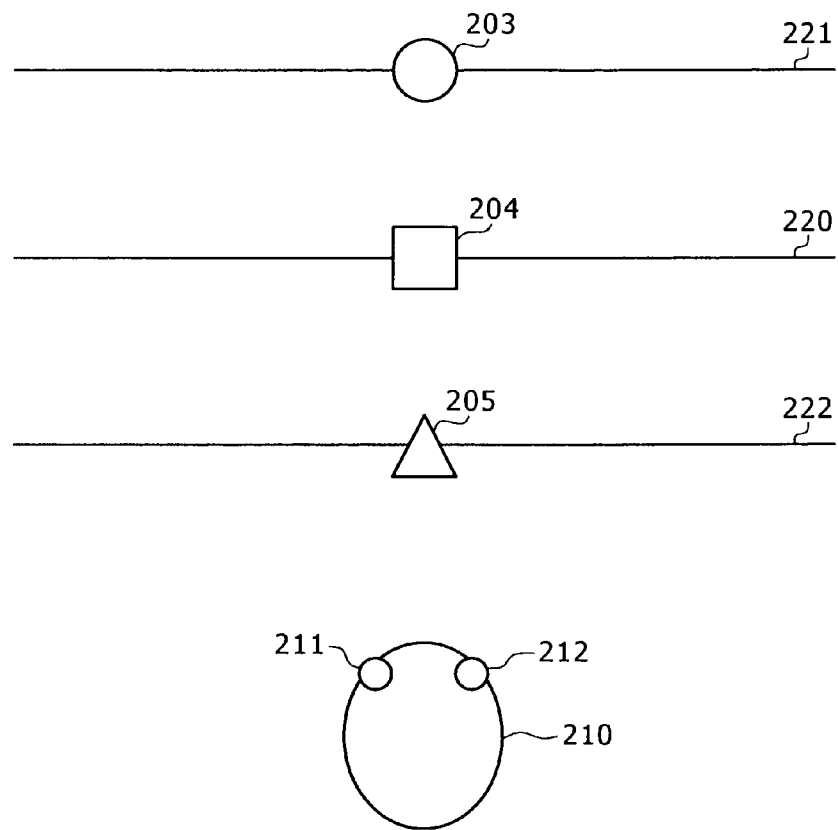
FIGS. 2A and 2B are schematic views illustrating a relationship between images which configure a stereoscopic image displayed on a display section shown in FIG. 1 and positions of bodies included in the images in the depthwise direction.
Figure 2B:
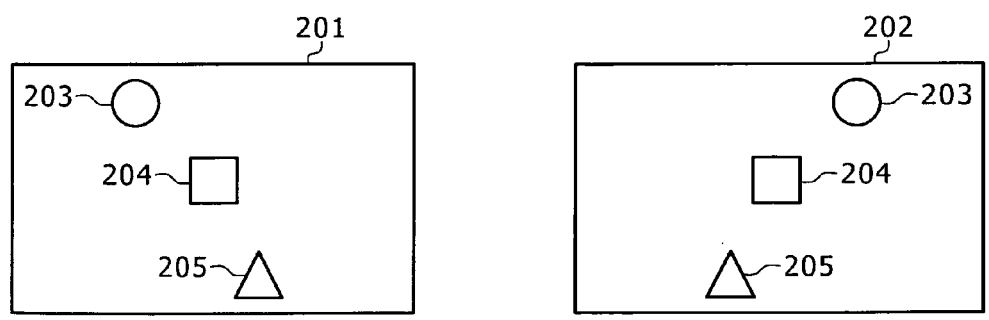

Example of the Relationship Between a Stereoscopic Image and the Position of a Body Included in the Stereoscopic Image in the Depthwise Direction FIGS. 2A and 2B illustrate a relationship between images which configure a stereoscopic image displayed on the display section 170 in the first embodiment and the positions of bodies included in the images in the depthwise direction. In particular, FIG. 2A schematically shows a top plan view in the case in which the positions of bodies 203 to 205 which a user 210 can watch stereoscopically are disposed virtually in the depthwise direction. FIG. 2B shows a stereoscopic image including a left eye image 201 and a right eye image 202 for causing the bodies 203 to 205 shown in FIG. 2A to be displayed stereoscopically. Referring to FIGS. 2A and 2B, the left eye image 201 and the right eye image 202 individually include the bodies 203 to 205. The depthwise direction is a direction parallel, for example, to a line interconnecting the user 210 and the display face of the display section 170 and perpendicular to the display face of the display section 170.

It is to be noted that, in FIGS. 2A and 2B, the same body is denoted by like reference characters on the left eye image 201 and the right eye image 202. Further, in FIGS. 2A and 2B, the displacement amount between the bodies 203 to 205 included in the left eye image 201 and the right eye image 202 is shown in an exaggerated fashion in order to facilitate understandings.

Further, in the first embodiment, a parallax barrier method or a method which uses glasses for exclusive use can be used as an example of the display method for displaying a stereoscopic image on the display section 170. The method which uses glasses for exclusive use is a method wherein the user wears glasses for exclusive use such as, for example, active shutter type glasses or polarizing plate type glasses for watching a stereoscopic image so that a stereoscopic image is provided to the user. It is to be noted that any other method than the parallax barrier method and the method which uses glasses for exclusive use can be applied in the present embodiment.

Here, it is assumed that, when the left eye image 201 and the right eye image 202 are displayed on the display section 170, the left eye 211 of the user 210 watches the left eye image 201 and the right eye 212 of the user 210 watches the right eye image 202. In this instance, the body 204 included in the left eye image 201 and the right eye image 202 is observed at a position 220 of the display face, that is, at a position of the display face of the display section 170, as seen in FIG. 2A. Further, it is assumed that the body 203 included in the left eye image 201 and the right eye image 202 is observed on the interior or remote side with respect to the position 220 of the display face, that is, on the interior side 221 of the display face, and the body 205 is observed on this side or on the near side with respect to the position 220 of the display face, that is, on this side 222 of the display face.

In this manner, in the case where the body 204 at the position 220 of the display face is determined as a reference, the bodies 203 and 205 which provide a stereoscopic effect are displaced in the horizontal direction in the stereoscopic image, that is, between the left eye image 201 and the right eye image 202. Further, in the case where the position 220 of the display face is determined as a reference, the displacement positions of the protruding body 205 and the receding body 203 are reversed relative to each other.

Figure 3:
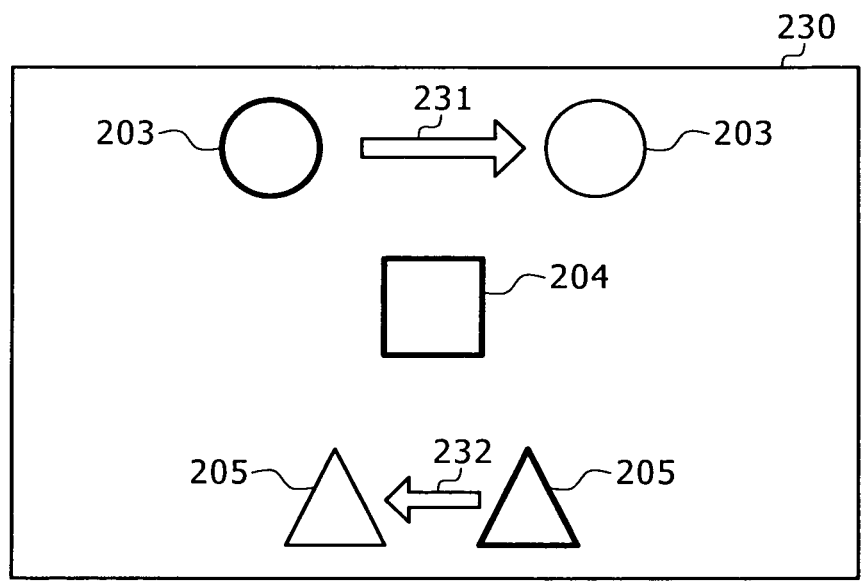
FIG. 3 is a schematic view illustrating a relationship among displacement amounts of the bodies shown in FIGS. 2A and 2B.

Example of the Relationship Between the Displacement Amount of a Body Included in the Left Eye Image and the Right Eye Image FIG. 3 illustrates a relationship of displacement amounts of bodies included in images which configure a stereoscopic image displayed on the display section 170 in the first embodiment. A rectangle 230 corresponds to the left eye image 201 and the right eye image 202 shown in FIG. 2B. In the rectangle 230, the bodies 203 to 205 included in the left eye image 201 and the right eye image 202 shown in FIG. 2B are shown. It is to be noted that, in the rectangle 230, the contour of the bodies 203 to 205 included in the left eye image 201 shown in FIG. 2B is indicated by a thick line. It is to be noted that no displacement occurs with the body 204 because it coincides with the position 220 of the display face as seen in FIG. 2A. Therefore, in the rectangle 230, the body images 204 included in the left eye image 201 and the right eye image 202 overlap with each other.

Further, in the rectangle 230, the displacement amount of the body 203 between the left eye image 201 and the right eye image 202 in the case where the left eye image 201 is determined as a reference is indicated by an arrow mark 231. Similarly, the displacement amount of the body 205 between the left eye image 201 and the right eye image 202 in the case where the left eye image 201 is determined as a reference is indicated by an arrow mark 232. It is to be noted that no displacement occurs with the body 204 as described hereinabove.

Since the parallax of the left and right eyes is utilized to obtain a stereoscopic vision in this manner, a body included in the left eye image 201 and the right eye image 202 is displaced in response to the display position of the body, that is, in response to the position of the body in the depthwise direction. In other words, the displacement amount of a body corresponds to the protruding amount or the receding amount of the stereoscopic body or 3D object. Therefore, the first embodiment provides an example wherein a left eye image and a right eye image which configure a stereoscopic image are compared with each other to calculate a displacement amount of a body and then a protruding amount or a receding amount of a stereoscopic body or 3D object is determined as a stereoscopic image parameter. Further, the first embodiment provides an example wherein a left eye image is determined as a reference and a protruding amount or a receding amount of a body included in the left eye image is determined based on a difference between the body included in the left eye image and the body included in the right eye image.

For example, if the body included in the left eye image which is determined as a reference is displaced to the left side, to the left side in FIG. 3, then the body is a protruding body and the displacement amount of the body is greater than 0, that is, the displacement amount>0.

On the other hand, for example, if the body included in the left eye image which is determined as a reference is displaced to the right side, that is, to the right side in FIG. 3, on the right eye image, then the body is a receding body and the displacement amount of the body is smaller than 0, that is, the displacement amount<0.

Or, for example, if a body included in the left eye image which is determined as a reference is not displaced on the right eye image, then the body corresponds to the position of the display face or screen face and the displacement amount of the body is zero, that is, the displacement amount=0.

In particular, the body 203 included in the left eye image 201 determined as a reference is displaced to the right side as indicated by the arrow mark 231 on the right eye image 202. Therefore, the body 203 is a receding body and the displacement amount thereof is smaller than zero, that is, the displacement amount of the body 203<0.

Meanwhile, the body 205 included in the left eye image 201 determined as a reference is displaced to the left side as indicated by an arrow mark 232 on the right eye image 202. Therefore, the body 205 is a protruding body and the displacement amount thereof is greater than zero, that is, the displacement amount of the body 205>0.

Further, the body 204 included in the left eye image 201 determined as a reference is not displaced on the right eye image 202. Therefore, the body 204 corresponds to the position of the display face, that is, on the screen face and the displacement amount thereof is zero, that is, the displacement amount of the body 204=0.

Example of Calculation of the Displacement Amount

Now, a calculation method for calculating a displacement amount of a body included in a stereoscopic image is described in detail.

Figure 4:
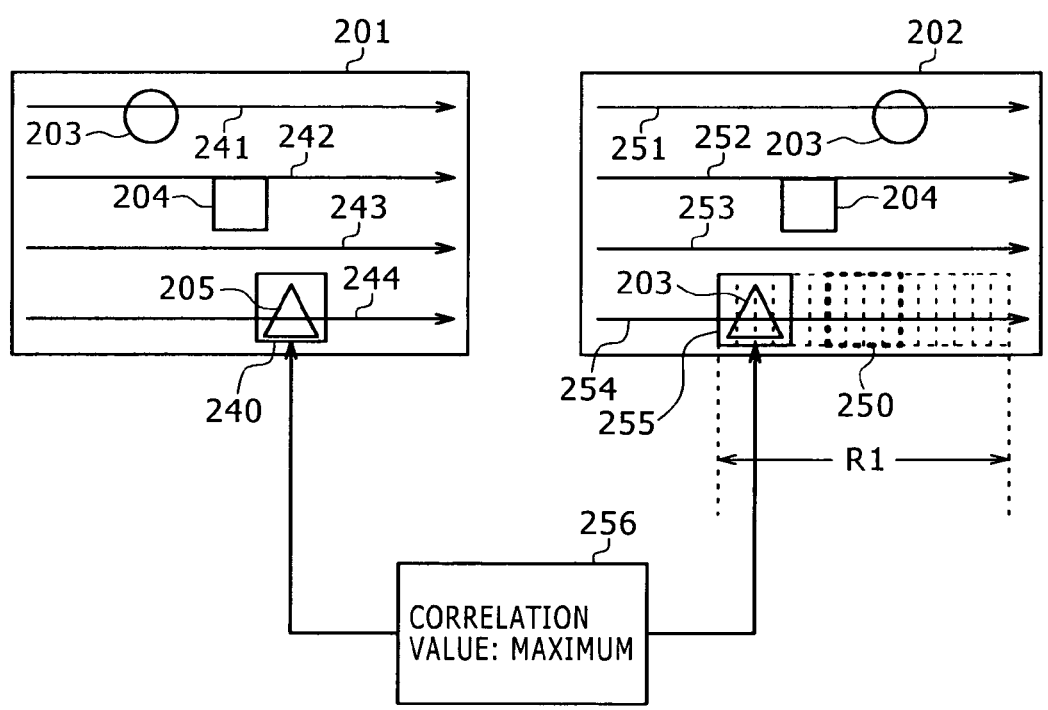
FIG. 4 is a view schematically illustrating a selection method of a block to be used as an object of a correlation value calculation process by a correlation value calculation section shown in FIG. 1 and a comparison process of the block.

FIGS. 4 to 5C schematically illustrate a selection method of a block to be determined as an object of a correlation value calculation process by the correlation value calculation section 140 in the first embodiment, that is, as a comparison object block, and a comparison process of such blocks. It is to be noted that the left eye image 201 and the right eye image 202 are similar to those in FIG. 2B.

When the correlation value calculation section 140 is to carry out a correlation value calculation process, it extracts an image included in a region of a particular size of the left eye image 201 determined as a reference, that is, extracts a left comparison object block. The comparison object block may have a size of, for example, 4 pixels×4 pixels.

Further, when the correlation value calculation section 140 is to carry out the correlation value calculation process, the position of the left upper corner of the left eye image 201 is selected as the position of the left comparison object block. Further, the position of the right eye image 202 corresponding to the position of the selected left comparison object block, which is a position on the left eye image 201, is selected as the position of the right comparison object block, that is, as the position of a first right comparison object block. The correlation value calculation section 140 calculates a correlation amount by comparing the two blocks of the left eye image 201 and the right eye image 202, that is, the left comparison object block and the first right comparison object block, with each other in this manner.

Thereafter, the position displaced by one pixel from the position of the first right comparison object block of the right eye image 202 in a horizontal direction is selected as the position of a new right comparison object block, that is, of a second right comparison object block. Then, the correlation value calculation section 140 compares the two blocks of the left eye image 201 and the right eye image 202, that is, the left comparison object block and the second right comparison object block, with each other to calculate a correlation value.

Also thereafter, a new right comparison object block, that is, an Mth right comparison object block, is successively selected while the right comparison object block is successively displaced by one pixel within the search range in the horizontal direction of the right eye image 202, that is, within a fixed range with reference to the first right comparison object block. Then, the left comparison object block and the Mth right comparison object block are compared with each other to calculate a correlation value. It is to be noted that the calculation method of a correlation value is hereinafter described in detail with reference to FIGS. 5A to 5C.

Then, the stereoscopic image parameter production section 150 extracts the highest correlation value from among the correlation values calculated by the comparison with the comparison object blocks in the search range in the horizontal direction of the right eye image 202. Then, the stereoscopic image parameter production section 150 determines the displacement amount of the right comparison object block corresponding to the extracted correlation value as a displacement amount with regard to the left comparison object block of the left eye image 201.

Here, the search range in the horizontal direction of the right eye image 202, that is, the range within which the right comparison object block is displaced, is described. For example, the maximum value of the displacement amount (mm) between the left eye image and the right eye image displayed on the display section 170 corresponds to the distance between the eyes of a human being, for example, 65 mm. Therefore, as the search range upon calculation of the displacement amount, a range of a number of pixels can be set based on the size in the horizontal direction of the display face of the display section 170 and the maximum value such as, for example, 65 mm of the distance between the eyes of a human being.

Further, the parallax amount between a left eye image and a right eye image which configure a stereoscopic image or 3D image which provides no unfamiliar feeling is determined to be 5%. In this instance, in order for the user to enjoy the stereoscopic image on a 65-inch (≈142 cm) display panel, the parallax amount on the display face of the display section 170 corresponds to approximately 71 mm. Further, if it is assumed that the display panel has a resolution of 1,920 pixels×1,080 pixels, then if the parallax amount is converted into a pixel number, then the pixel number N is N=1,920×71/1,420=96 pixels. Accordingly, as the search range, a range of "−96<m<96" can be set.

Now, movement of the left comparison object block is described. After a first displacement amount is determined, the left comparison object block of the left eye image 201 is shifted by four pixels in the rightward direction, that is, in a direction indicated by arrow marks 241 to 244. In response to the shift of the left comparison object block, the right comparison object block of the right eye image 202 is shifted by four pixels in the rightward direction, that is, in a direction indicated by arrow marks 251 to 254 to select the block as the first right comparison object block. Thereafter, a new right comparison object block, that is, an Mth right comparison object block, is successively selected within the search range in the horizontal direction of the right eye image 202 as described hereinabove, and a correlation value is calculated by comparison between the left comparison object block and the Mth right comparison object block. Then, a displacement amount as regards the left comparison object block of the left eye image 201 is determined.

Also thereafter, the left comparison object block of the left eye image 201 is successively shifted by four pixels in the rightward direction similarly. Then, if the left comparison object block is shifted to the right end of the left eye image 201 and a correlation value calculation process and a displacement amount determination process with regard to the left comparison object block are completed, then the left comparison object block is shifted by four pixels in the downward direction and is moved to the left end of the left eye image 201. Then, if the left comparison object block is shifted to the right end at the lower end of the left eye image 201 and the correlation value calculation process and the displacement amount determination process are completed with regard to the left comparison object block, then the correlation value calculation process and the displacement amount determination process with regard to the one stereoscopic image are completed. Also thereafter, the correlation value calculation process and the displacement amount determination process are successively carried out similarly with regard to the next stereoscopic image.

Here, a case is assumed wherein a left comparison object block 240 is disposed on the left eye image 201 and a right comparison object block, that is, a first right comparison object block 250, of the right eye image 202 corresponding to the left comparison object block 240, is selected. In particular, a correlation value calculation process and a displacement amount determination process in the case where the left comparison object block 240 is disposed at the position of the body 205 included in the left eye image 201 are described.

First, the left comparison object block 240 and the first right comparison object block 250 are compared with each other to calculate a correlation value. Then, within a search range R1 in the horizontal direction of the right eye image 202, a new right comparison object block, that is, an Mth right comparison object block, is successively selected while the right comparison object block is successively displaced by one pixel. Then, the left comparison object block 240 and the Mth right comparison object block, which is, in FIG. 4, each rectangle indicated by broken lines, are compared with each other to calculate a correlation value.

Then, the stereoscopic image parameter production section 150 extracts the highest correlation value from among the correlation values calculated by the comparison of the right comparison object blocks in the search range R1 in the horizontal direction of the right eye image 202. In the present example, the stereoscopic image parameter production section 150 extracts the correlation value calculated with regard to the right comparison object block 255 in the search range R1 as the highest correlation value (256). In this instance, the stereoscopic image parameter production section 150 determines the displacement amount of the right comparison object block 255 corresponding to the extracted correlation value as the displacement amount as regards the left comparison object block 240 in the left eye image 201.

FIGS. 5A and 5B show, in an enlarged scale, portions, that is, corresponding regions, of two images, that is, a left eye image and a right eye image, which configure a stereoscopic image which is determined as an object of a correlation value calculation process by the correlation value calculation section 140. In particular, FIG. 5A shows an image 260 of 4 pixels×8 pixels corresponding to a portion of a left eye image, and an image 270 of 4 pixels×8 pixels corresponding to a portion of a right eye image, in a juxtaposed relationship to each other. It is to be noted that each of rectangles which configure the images 260 and 270 represents a pixel, and semicircles 261 and 271 included in the images 260 and 270 schematically show part of a body included in the left eye image and the right eye image.

First, a calculation method of a correlation value is described. The correlation value C(m) is calculated in accordance with the following expression (1):

$$C(m) = \frac{\sum_{n=0}^{N-1} x_L(n) x_R(n+m)}{\sqrt{\sum_{n=0}^{N-1} x_L(n)^2} \sqrt{\sum_{n=0}^{N-1} x_R(n+m)^2}} \quad (1)$$

where m is the displacement amount which assumes a value within the search range. For example, where the search range is represented by 2R (2×R (R is a positive integer)), the reference position is zero, the left side in the leftward and rightward direction is the negative in sign and the right side in the leftward and rightward direction is the positive in sign, the displacement amount m is given by −R≤m≤R.

Further, N is the pixel number of an image of an object of correlation value calculation, that is, the pixel number of a comparison object block. In the first embodiment, N=16. Further, n is the identification number for identifying a pixel in the comparison object block, and each pixel in the comparison object block has an identification number from 0 to 15 applied thereto in response to the arrangement position of the pixel. Further, $X_L$ is the pixel number in the comparison object block in the left eye image while $X_R$ is the pixel value in the comparison object block in the right eye image.

Here, the correlation value C(m) is normalized such that the highest value thereof is 1. In other words, C(m)≤1 is satisfied. Therefore, a maximum value of the correlation value calculated with regard to each comparison object block is equal to or lower than 1.

In particular, in the case where the correlation value calculation section 140 carries out the correlation value calculation process, it calculates the correlation value C(m) using the expression (1) given hereinabove with regard to each of the pixels in a left comparison object block 262 represented as a rectangle of broken lines and each pixel in a first right comparison object block 272 represented as a rectangle of broken lines.

Then, the position displaced from the position of the right comparison object block of the image 270 by one pixel in the horizontal direction is selected as the position of a new right comparison object block 272, that is, a second right comparison object block 272, as seen in FIG. 5B. Then, the correlation value calculation section 140 calculates the correlation value C(m) using the expression (1) given hereinabove with regard to each of the pixels in the left comparison object block 262 represented as a rectangle of broken lines and each of the pixels the first right comparison object block 272 represented as a rectangle of broken lines in FIG. 5B.

Thereafter, the correlation value C(m) is calculated using the expression (1) with regard to each of the pixels in the left comparison object block 262 represented as a rectangle of broken lines and each of the pixels in the Mth right comparison object block 272 represented as a rectangle of broken lines in the search rang as seen in FIG. 5C. Then, if the calculation process of the correlation value C(m) in the search range comes to an end, then the stereoscopic image parameter production section 150 extracts the correlation value C(m) which is nearest to 1 from among the correlation values C(m) calculated with regard to the comparison object blocks. In the present example, the correlation value C(m) calculated with regard to the first right comparison object block 272 shown in FIG. 5B is extracted as the highest correlation value. In this instance, the stereoscopic image parameter production section 150 determines the displacement amount 1 (m=1) of the first right comparison object block 272 corresponding to the extracted correlation value C(m) as the displacement amount with regard to the left comparison object block 262 in the left eye image.

FIGS. 6A and 6B show, in an enlarged scale, corresponding portions of two images, which are a left eye image and a right eye image, which configure a stereoscopic image which is determined as an object of the correlation value calculation process by the correlation value calculation section 140 in the first embodiment. It is to be noted that FIGS. 6A to 6C are similar to FIGS. 5A to 5C, respectively, except the position of the semicircle 276 representative of a body which is included in the image 275 of 4 pixels×8 pixels.

In particular, FIGS. 6A and 6B schematically illustrate that the position of the semicircle 276 representing a body included in the left eye image is displaced by 0.5 pixels to the right side from the position of the semicircle 271 representing a body included in the image 270 shown in FIGS. 5A and 5B.

In the example illustrated in FIGS. 5A and 5B, the semicircle 261 representing a body included in the left eye image and the semicircle 271 representing a body included in the right eye image are displaced by one pixel from each other. However, also a case may possibly occur in which bodies included in the left eye image and the right eye image are not displaced from each other in a unit of a pixel, that is, in a unit of an integer. For example, a case may occur in which bodies included in the left eye image and the right eye image are displayed by a unit of a fraction, for example, by a unit of 0.5 pixels as seen in FIGS. 6A and 6B. Also in such a case, the calculation of a correlation value using the expression (1) given hereinabove must only determine a displacement amount with which a maximum correlation value is exhibited within a fixed search range. Therefore, the calculation described can be applied also to a case in which bodies included in the left eye image and the right eye image are displaced in a unit of a fraction.

It is to be noted that, in order to determine a displacement amount with a high degree of accuracy, the displacement amount may be determined in a unit of a fraction by a filter process with peripheral pixels such as, for example, a filter process by an interpolation filter which determines a moving average.

Example of the Displacement Amount Retaining Table

Figure 7A:
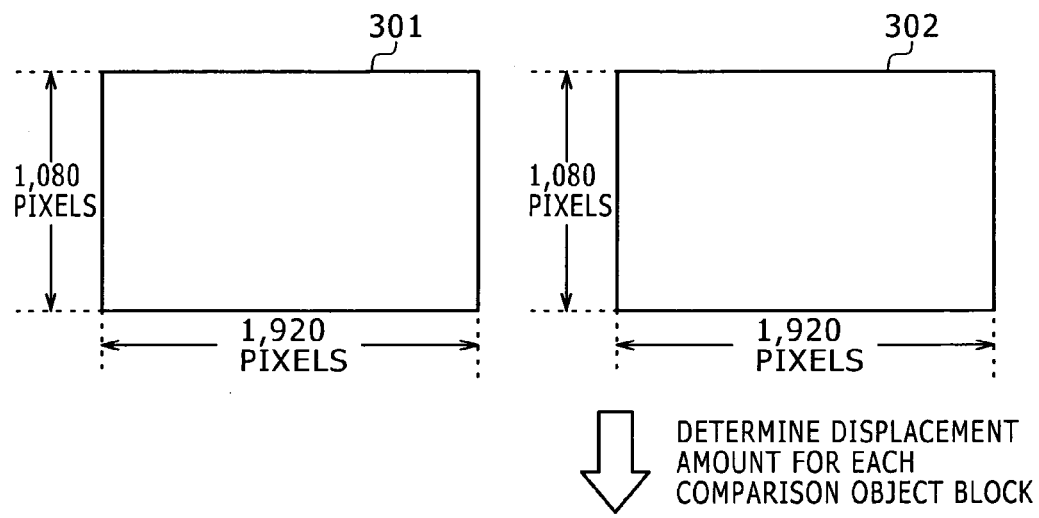
FIGS. 7A and 7B are views schematically illustrating an example of a displacement amount retaining table produced by a stereoscopic image parameter production section shown in FIG. 1.
Figure 7B:
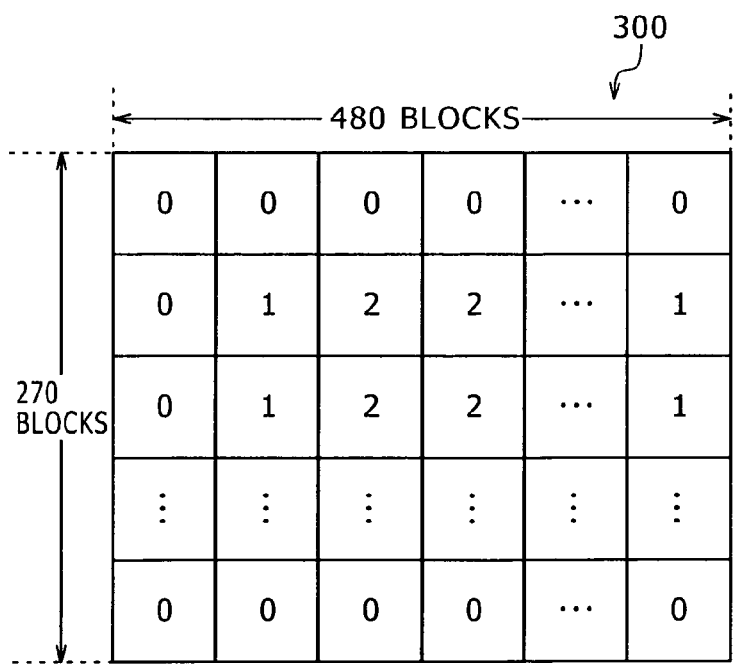

FIGS. 7A and 7B schematically illustrate an example of a displacement amount retaining table produced by the stereoscopic image parameter production section 150 in the first embodiment, that is, a displacement amount retaining table 300. In particular, FIG. 7A shows a stereoscopic image which is used upon production of the displacement amount retaining table 300, that is, a left eye image 301 and a right eye image 302. The left eye image 301 and the right eye image 302 include 1,920 pixels×1,080 pixels. It is to be noted that, in FIG. 7A, only rectangles corresponding to the left eye image 301 and the right eye image 302 are shown while bodies and so forth included in the images are omitted.

FIG. 7B illustrates the displacement amount retaining table 300 in which displacement amounts calculated with regard to the left eye image 301 and the right eye image 302 are retained in a unit of a block. If a correlation value process is carried out in a unit of a block of 4 pixels×4 pixels with regard to the left eye image 301 and the right eye image 302 composed of 1,920 pixels×1,080 pixels, then 129,600 (480×270) displacement amounts are calculated for the individual blocks. The stereoscopic image parameter production section 150 retains the displacement amounts calculated for the individual blocks in this manner in an associated relationship with the blocks of the calculation object, that is, the left comparison object blocks, into the displacement amount retaining table 300.

Further, FIG. 7B illustrates the displacement amounts produced by the stereoscopic image parameter production section 150 and stored at positions of the displacement amount retaining table 300 which correspond to the positions of the blocks of the left eye image 301, that is, the left comparison object blocks. Or, although a displacement amount may be calculated in a unit of a pixel or in a unit of a fraction as described hereinabove, in FIG. 7B, the displacement amounts calculated in a unit of a pixel are retained in order to facilitate description. Further, although a displacement amount can be calculated not only as zero but also as a positive value, which is a value in a protruding direction representing a protruding amount, or a negative value, which is a value in a receding direction representing a receding amount, in FIG. 7B, only positive values are illustrated in order to facilitate description.

The stereoscopic image parameter production section 150 outputs the displacement amount retaining table 300 produced in this manner to the video-audio outputting control section 160. Thus, the video-audio outputting control section 160 can use, when it is to output video data outputted from the video decoding section 120 and audio data outputted from the audio decoding section 130, the retained substance of the displacement amount retaining table 300 to carry out such output control. For example, when a stereoscopic image is to be displayed on the display section 170 based on video data outputted from the video decoding section 120, the video-audio outputting control section 160 can use the retained substance of the displacement amount retaining table 300 to adjust the protruding amount or receding amount of each of bodies included in the stereoscopic image. Further, it is assumed, for example, to output sound relating to the stereoscopic image from the sound outputting section 180 based on the audio data outputted from the audio decoding section 130. In this instance, the sound relating to the stereoscopic image can be adjusted in response to the protruding amount or the receding amount of each of the bodies included in the stereoscopic image using the retained substance of the displacement amount retaining table 300.

In this manner, when video data and audio data are to be outputted, the retained substance of the displacement amount retaining table 300 can be used to carry out output control in a unit of a block. Here, by detecting bodies which can be watched stereoscopically, that is, by detecting stereoscopic bodies, in a stereoscopic image and retaining the bodies into regions corresponding to the stereoscopic bodies in advance, it is considered possible to carry out various kinds of output control in a unit of a body. Thus, in the following, an example wherein a stereoscopic image is detected and regions corresponding to stereoscopic bodies are retained is described.

Example of Detection of a Stereoscopic Body

Figure 8:
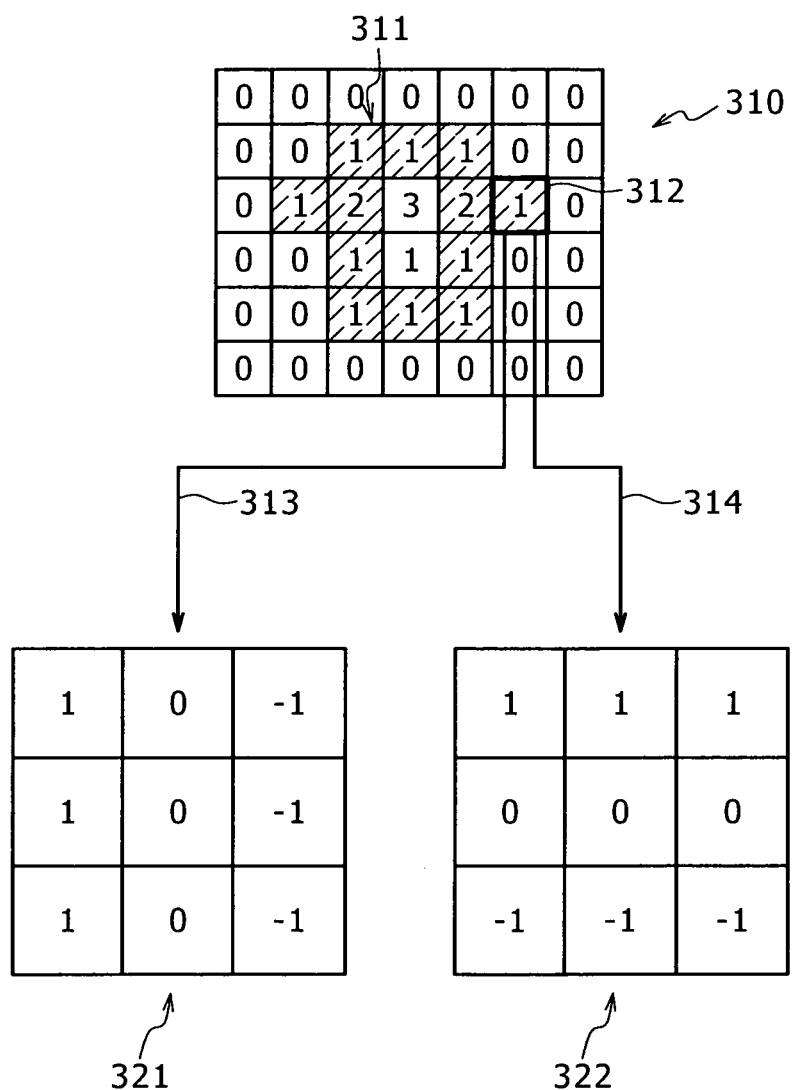
FIG. 8 is a schematical view illustrating an example of a differential filter used in a binarization process by the stereoscopic image parameter production section.

FIG. 8 illustrates an example of a differential filter used for a binarization process by the stereoscopic image parameter production section 150 in the first embodiment, particularly a differential filter 321 for the X direction and a differential filter 322 for the Y direction. FIG. 8 further illustrates a displacement amount retaining table 310 which is an object of a detection process of a stereoscopic body, that is, a detection process of a 3D object region. It is to be noted that, in FIG. 8, the displacement amount retaining table 310 is shown in a simplified form in order to facilitate illustration.

The differential filter 321 for the X direction is provided to determine the difference in the X direction, that is, in the horizontal direction of the image, and the differential filter 322 for the Y direction is provided to determine the difference in the Y direction, that is, in the vertical direction of the image.

In this example, as a detection method of a stereoscopic body, an example is described wherein a stereoscopic body is detected by carrying out an edge detection process with regard to a region having a displacement amount which is not equal to zero, that is, a displacement amount non-zero region, which is tangent to a region having a displacement amount of zero, that is, a displacement amount zero region, in the displacement amount retaining table 310.

In FIG. 8, a rectangle group 311 corresponding to displacement amount non-zero regions tangent to displacement amount zero regions in the displacement amount retaining table 310 is darkened. Thus, an edge detection process is carried out for those pixels which correspond to blocks which configure the rectangle group 311.

For example, for pixel groups of 4 pixels×4 pixels corresponding to blocks 312 which configure the rectangle group 311, an edge detection process is carried out using the differential filter 321 for the X direction and the differential filter 322 for the Y direction as indicated by arrow marks. It is to be noted that those pixel groups which correspond to the blocks 312 which configure the rectangle group 311 are shown as image blocks 330 having the displacement amount of non-zero in FIG. 9A.

Figure 9A:
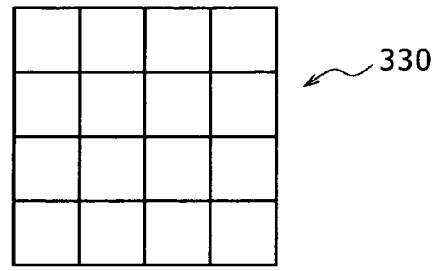
FIGS. 9A to 9C are diagrammatic views schematically illustrating a flow of the binarization process by the stereoscopic image parameter production section.
Figure 9B:
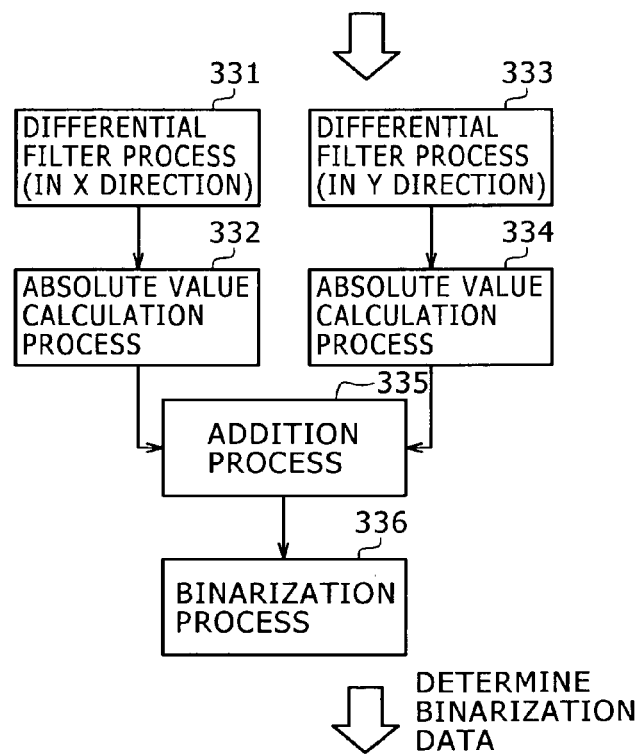
Figure 9C:
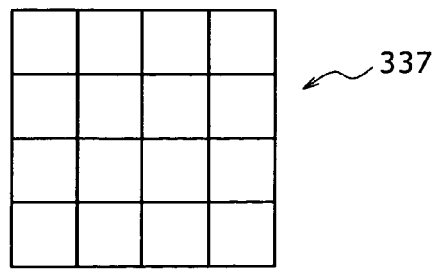

FIGS. 9A to 9C schematically illustrate a flow of a binarization process by the stereoscopic image parameter production section 150 in the first embodiment. FIG. 9A particularly shows a pixel group corresponding to the blocks 312 which configure the rectangle group 311 shown in FIG. 8 as the image blocks 330 having the displacement amount of non-zero.

FIG. 9B schematically illustrates a flow of the binarization process. Referring to FIG. 9B, the differential filter 321 for the X direction is first used to carry out a filter process 331 for the X direction with regard to the pixels which configure the image blocks 330 having the displacement amount of non-zero as described above. Further, the differential filter 322 for the Y direction is used to carry out a filter process 333 for the Y direction with regard to the image blocks 330 having the displacement amount of non-zero.

Then, absolute values of the values calculated by the filter process 331 for the X direction are calculated as represented as an absolute value calculation process 332. Further, absolute values of the values calculated by the filter process 333 for the Y direction are calculated as represented as an absolute value calculation process 334.

Then, the absolute values calculated by the absolute value calculation process 332 and the absolute values calculated by the absolute value calculation process 334 are added to calculate addition values, that is, absolute value sums, as represented as an addition process 335.

Thereafter, a binarization process 336 is carried out based on the addition values calculated by the addition process 335. In particular, if an addition value calculated by the addition process 335 is equal to or higher than a threshold value, then the addition value is set to "1," but if the addition value calculated by the addition process 335 is lower than the threshold value, then the addition value is set to "0." Then, a result of the binarization process 336, that is, binarization data of 0 or 1, is retained as binarization data 337 of an image block for each pixel. Further, the binarization data of 0 or 1 calculated in this manner are retained in an associated relationship into the displacement amount retaining table 310.

For example, if a closed region of a stereoscopic image is specified with calculated binarization data of 0 or 1, then the stereoscopic image parameter production section 150 detects the closed region as a stereoscopic body. If a stereoscopic body is detected in this manner, then the stereoscopic image parameter production section 150 associates the region corresponding to the detected body and the displacement amount of the detected body to produce a stereoscopic image parameter. Further, if a plurality of bodies are included in the stereoscopic image, then the plural bodies are detected for the individual bodies, and regions corresponding to the detected bodies and displacement amounts of the detected bodies are associated with each other to produce a stereoscopic image parameter. In the case where a plurality of bodies are detected in this manner, it is necessary for a region corresponding to each body to be a closed region. It is to be noted that the stereoscopic image parameter production section 150 may convert the displacement amount of the detected body into a depth amount, that is, a protruding amount or a receding amount and associate a region corresponding to the detected body and a depth amount of the detected body with each other to produce a stereoscopic image parameter.

Figure 10A:
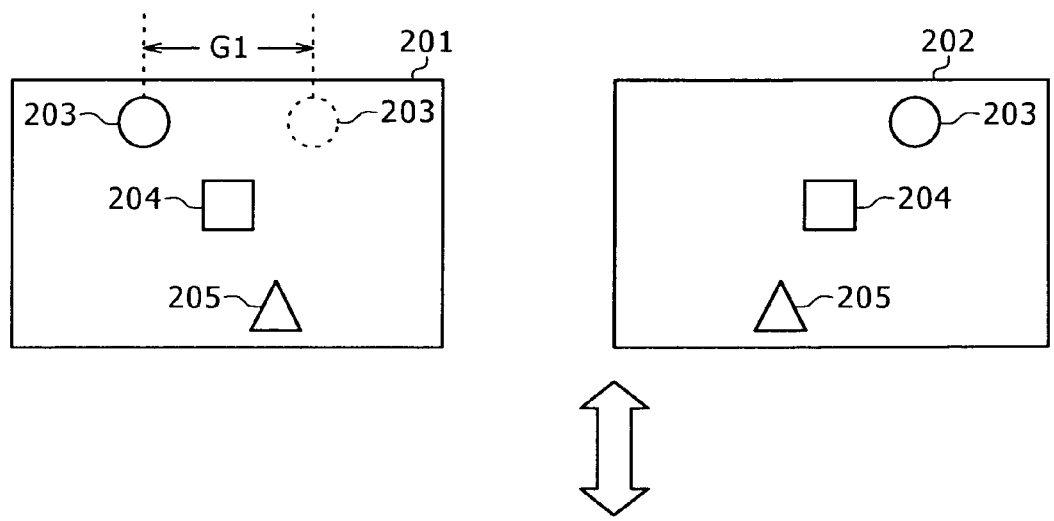
FIGS. 10A and 10B are schematic views illustrating a relationship between a displacement amount in a stereoscopic image corresponding to video data decoded by an video decoding section and a displacement amount on the display face of the display section.
Figure 10B:
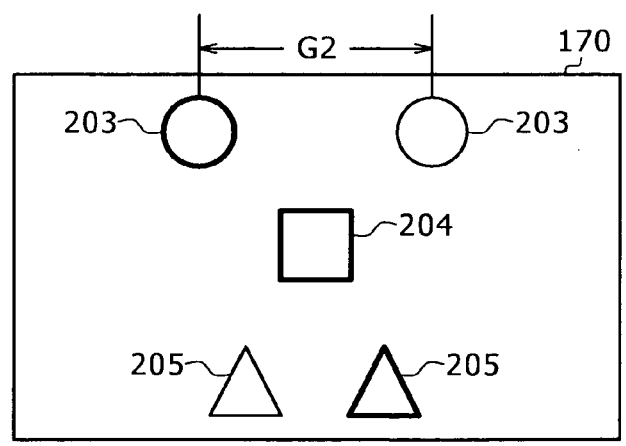

Example of the Relationship Between the Displacement Amount on an Image and the Displacement Amount on the Display Face FIGS. 10A and 10B illustrate a relationship between the displacement amount in a stereoscopic image corresponding to video data decoded by the video decoding section 120 and the displacement amount on the display face of the display section 170 in the first embodiment. More particularly, FIG. 10A shows a left eye image 201 and a right eye image 202 which configure a stereoscopic image. The left eye image 201 and the right eye image 202 shown in FIG. 10A are similar to those shown in FIG. 2B. In FIG. 10A, the displacement amount of a body 203 in the left eye image 201, that is, the displacement amount of the body 203 included in the right eye image 202, is represented as displacement amount G1.

FIG. 10B shows a stereoscopic image displayed on the display section 170. It is to be noted that, in FIG. 10B, the left eye image 201 and the right eye image 202 shown in FIG. 10A are shown in a synthesized form. In FIG. 10B, the displacement amount on the display face of the display section 170, that is, the displacement amount between the body images 203 included in the left eye image 201 and the right eye image 202 on the display face of the display section 170, is represented as displacement amount G2.

In this manner, the video-audio outputting control section 160 uses the produced stereoscopic image parameter to cause the display section 170 to display a stereoscopic image based on the relationship between the displacement amount in the stereoscopic image and the displacement amount on the display face of the display section 170. To this end, the video-audio outputting control section 160 retains in advance a conversion table between the displacement amount in a stereoscopic image and the displacement amount on the display face of the display section 170 and carries out display control of a stereoscopic image using the produced stereoscopic image parameter based on the conversion table.

Figure 11:
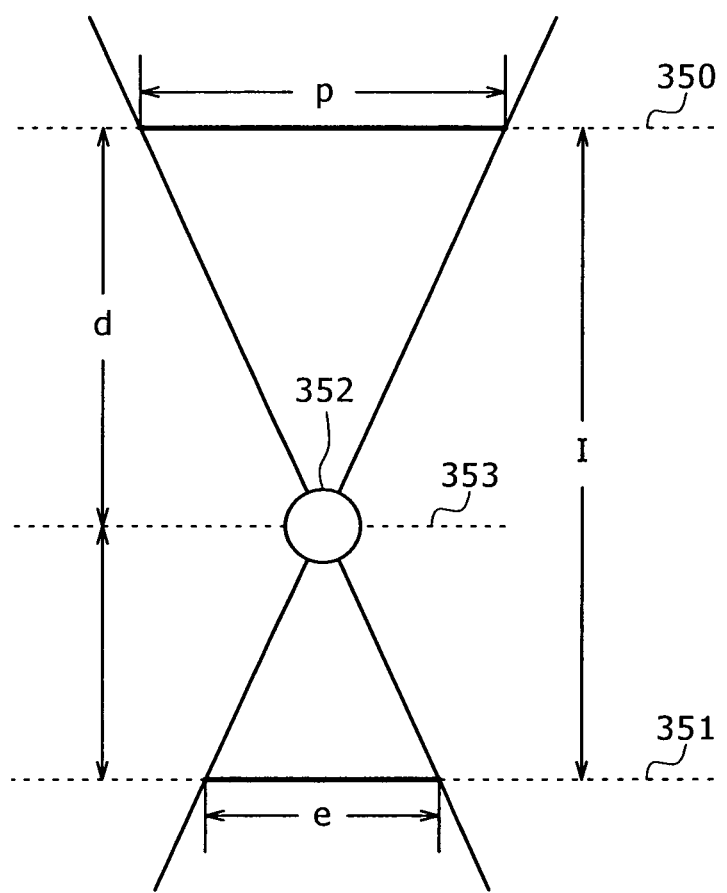
FIG. 11 is a diagrammatic view schematically illustrating a relationship between a viewing position in the case where a stereoscopic image is displayed on the display section is viewed and a body, that is, a stereoscopic body, included in the stereoscopic image.

Example of the Configuration Between the Viewing Position and the Protruding Position FIG. 11 schematically illustrates a relationship between the viewing position in the case where a stereoscopic image displayed on the display section 170 is viewed by the user and the protruding position of a body included in the stereoscopic image, that is, of a protruding body in the first embodiment.

Referring to FIG. 11, the position at which a stereoscopic image is displayed, that is, on the display face of the display section 170, is represented by a position 350 of the display face, and the viewing position of the user in the case where a stereoscopic image displayed on the display section 170 is viewed is represented by a viewing position 351. Further, the protruding position of a body, that is, a stereoscopic body 352, which the user who views the stereoscopic image can view in this state is represented as a protruding position 353.

Here, the displacement amount of the stereoscopic body 352 included in the stereoscopic image, that is, the displacement amount on the display face, is represented by p, the distance between the position 350 of the display face and the viewing position 351 by l, and the distance between the eyes of the user who is viewing the stereoscopic image by e. Further, the distance between the position 350 of the display face and the protruding position 353, that is, the protruding amount, is represented by d.

In this instance, the relationship among the position 350 of the display face, viewing position 351 and protruding position 353 satisfy, from an orthomorphic relationship, the following expression (2).

$$d:p=1-d:e \quad (2)$$

Further, by transforming the expression (2), $d=pl/(e+p)$ is determined.

In particular, if p=71 mm, l=2,000 mm and e=65 mm are substituted, then the protruding amount d can be determined as 1,044 mm (d=71×2,000/(65+71)).

In this manner, the protruding amount of a body in a stereoscopic image can be determined using the displacement amount of the body. Therefore, the video-audio outputting control section 160 can carry out adjustment of the depth amount, that is, the protruding amount or the receding amount, of a body in a stereoscopic image using the displacement amount of the body.

Example of Operation of the Information Processing Apparatus

Now, operation of the information processing apparatus 100 according to the first embodiment is described with reference to the drawings.

Figure 12:
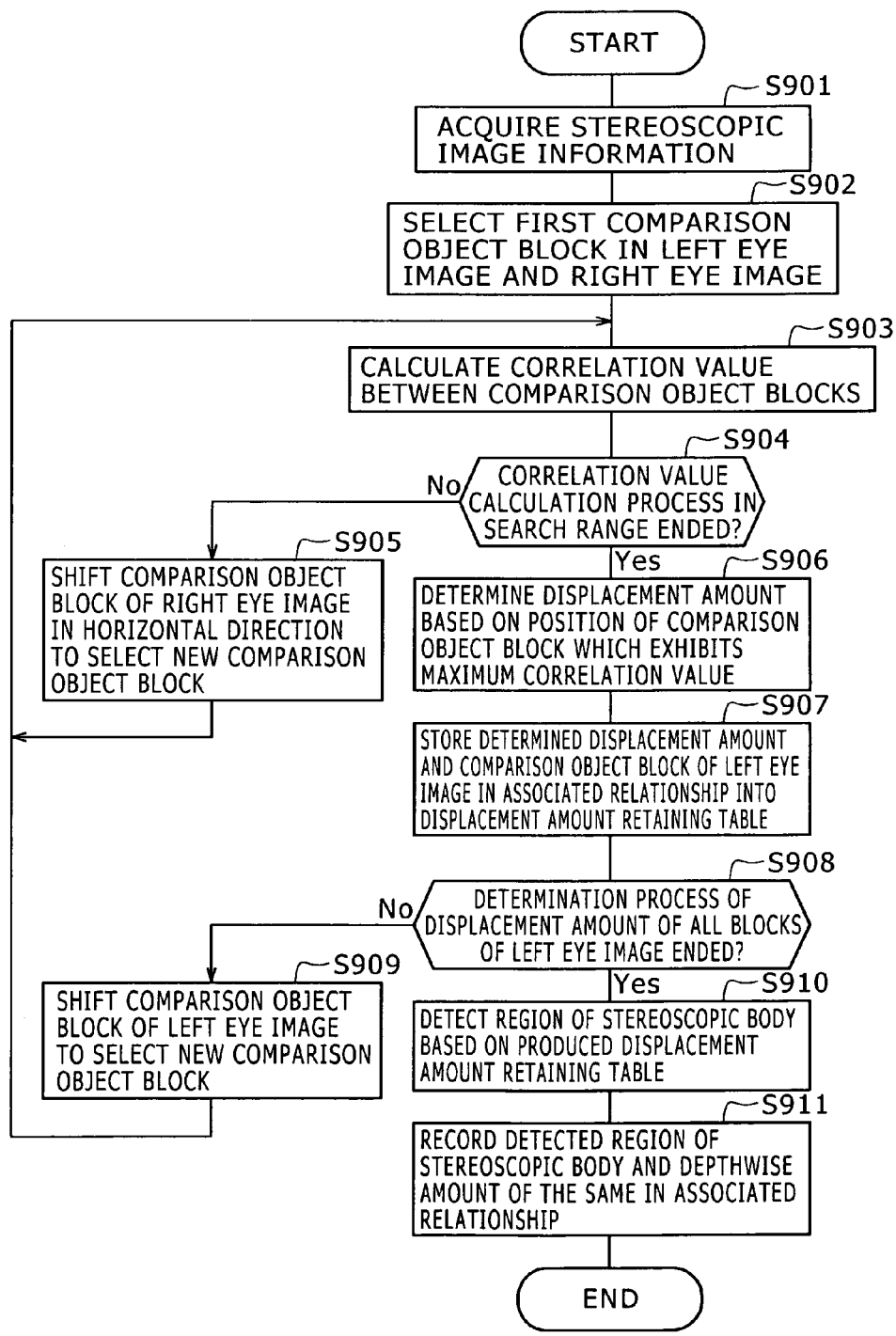
FIG. 12 is a flow chart illustrating an example of a processing procedure of a stereoscopic image parameter production control process by the information processing apparatus.

FIG. 12 illustrates an example of a processing procedure of the stereoscopic image parameter production controlling process by the information processing apparatus 100 according to the first embodiment.

Referring to FIG. 12, first at step S901, the broadcast reception section 110 receives a broadcasting wave and demodulates a video signal, and the video decoding section 120 carries out a decoding process of the video signal to reproduce video data, that is, video data for causing a stereoscopic image to be displayed. In short, at step S901, stereoscopic image information is acquired. It is to be noted that the process at step S901 is an example of the acquisition step in the disclosed technology.

Then at step S902, the correlation value calculation section 140 selects a first comparison object block of each of a left eye image and a right eye image. Then at step S903, the correlation value calculation section 140 compares the two selected comparison object blocks of the left eye image and the right eye image with each other to calculate a correlation value between them. Then at step S904, it is decided whether or not the correlation value calculation process within a search range in the horizontal direction of the right eye image is ended. If the correlation value calculation process in the search range is not ended as yet at step S904, then the correlation value calculation section 140 shifts the comparison object block in the right eye image in the horizontal direction to select a new comparison object block at step S905. Thereafter, the processing returns to step S903.

On the other hand, if the correlation value calculation process within the search range is ended at step S904, then the stereoscopic image parameter production section 150 extracts the highest correlation value from among the correlation values calculated by the comparison of the comparison object blocks within the search range at step S905. Then, the stereoscopic image parameter production section 150 determines the displacement amount of the comparison object block corresponding to the extracted correlation value as a displacement amount with regard to the left comparison object block in the left eye image at step S906.

Thereafter, the stereoscopic image parameter production section 150 retains the determined displacement amount in an associated relationship with the comparison object block of the calculation object into the displacement amount retaining table at step S907.

Then at step S908, it is decided whether or not the displacement amount determination process is ended with regard to all comparison object blocks in the left eye image. If the displacement amount determination process is not ended with regard to all comparison object blocks at step S908, then a comparison object block with regard to which the displacement amount determination process is not ended is selected as a new comparison object block at step S909. Thereafter, the processing returns to step S903. In particular, the correlation value calculation section 140 selects one of those comparison object blocks in the left eye image with regard to which the displacement amount determination process is not ended as a new comparison object block at step S909. Thereafter, the processing returns to step S903.

On the other hand, if the displacement amount determination process is ended with regard to all comparison object blocks in the left eye image at step S908, then a region of a body included in the stereoscopic image is detected at step S910. In particular, the stereoscopic image parameter production section 150 detects, based on the displacement amount retaining table produced as described above, a region of a body included in the stereoscopic image, that is, a body or stereoscopic body which can be watched stereoscopically at step S910. Then, the stereoscopic image parameter production section 150 produces a stereoscopic image parameter by associating a region corresponding to the detected body and a depth amount of the detected body at step S911, thereby ending the operation of the stereoscopic image parameter production controlling process. It is to be noted that the processes at steps S902 to S911 are an example of the production step.

In this manner, with the first embodiment of the disclosed technology, a region of a stereoscopic image or 3D object included in a stereoscopic image or 3D image and a stereoscopic image parameter such as, for example, a protruding amount or a receding amount relating to the region can be determined. In other words, various kinds of information necessary to implement a 3D broadcasting application which provides an agreeable feeling and a feeling of presence to the user can be determined. Further, since the various kinds of information can be provided to the user, the user can readily carry out editing, working and so forth of a stereoscopic image in accordance with its liking. For example, it is possible to use a region of a stereoscopic body and a depth amount such as a protruding amount or a receding amount with regard to the region to adjust and display the stereoscopic image. Consequently, when the user watches the stereoscopic image, the display of the stereoscopic image can be made more agreeable with a feeling of presence provided to the user. Further, in the case where an image corresponding to a broadcasting wave which includes, for example, a planar image, that is, a 2D image, and a stereoscopic image, that is, a 3D image, is to be displayed on a television receiver for home use, also it is assumed that a planar image and a stereoscopic image change over frequently by changeover of a channel or by a CM. Also in this instance, the user can readily carry out editing, working and so forth of the stereoscopic image in accordance with its liking. Therefore, a disagreeable feeling which the user may feel can be reduced. In this manner, with the first embodiment of the disclosed technology, a parameter for causing a stereoscopic image conforming to the liking of the user to be displayed can be produced appropriately.

<2. Second Embodiment>

In the first embodiment described above, before video data corresponding to a received broadcasting wave are displayed, a stereoscopic image parameter is produced and used to carry out display control of the video data. However, also it can be supposed that video data corresponding to a received broadcasting wave are recorded and then viewed later at time favorable to the user. Therefore, in the second embodiment of the disclosed technique, a stereoscopic image parameter of video data corresponding to a received broadcasting wave is produced, and the stereoscopic image parameter and the video data are recorded in an associated relationship with each other. It is to be noted that the configuration of the information processing apparatus according to the second embodiment is substantially similar to that described hereinabove with reference to FIG. 1. Therefore, the following description is given principally of differnces of the second embodiment from the first embodiment.

Example of the Configuration of the Information Processing Apparatus

Figure 13:
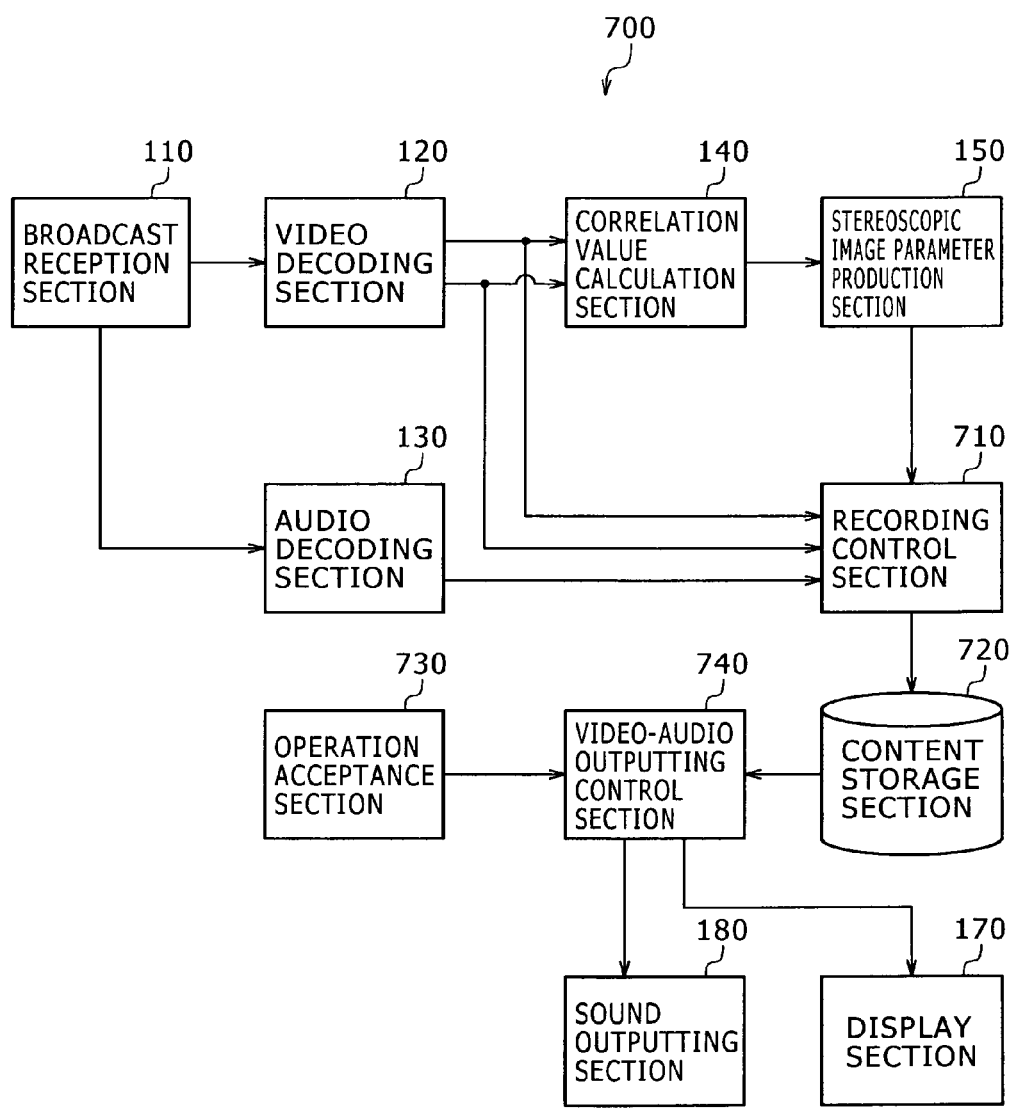
FIG. 13 is a block diagram showing an example of a functional configuration of an information processing apparatus according to a second embodiment of the disclosed technology.

FIG. 13 shows an example of a functional configuration of the information processing apparatus 700 according to the second embodiment of the disclosed technology. Referring to FIG. 13, the information processing apparatus 700 shown includes an operation acceptance section 730 and a video-audio outputting control section 740 in place of the operation acceptance section 190 and the video-audio outputting control section 160 of the information processing apparatus 100 of FIG. 1, respectively. The information processing apparatus 700 additionally includes a recording control section 710 and a content storage section 720. The information processing apparatus 700 is implemented, for example, by a digital video recorder or a HDD (Hard Disk Drive) recorder which receives broadcasting waves from broadcasting stations and records video data and audio data.

The recording control section 710 controls the content storage section 720 to record an image and sound, which correspond to a broadcasting wave received by the broadcast reception section 110, as a content. In particular, the recording control section 710 controls the content storage section 720 to record a content wherein video data outputted from the video decoding section 120 and audio data outputted from the audio decoding section 130 are associated with each other. Further, in the case where the video data outputted from the video decoding section 120 are those of a stereoscopic image, the recording control section 710 records the content and a stereoscopic image parameter produced by the stereoscopic image parameter production section 150 in an associated relationship with each other. In particular, the recording control section 710 controls the content storage section 720 to record a content wherein video data and audio data are associated with each other and which includes stereoscopic image information and the stereoscopic image parameter in an associated relationship with each other. Further, if one or a plurality of bodies included in the stereoscopic image are detected by the stereoscopic image parameter production section 150, then a region of each detected body and the depth amount of the body may be recorded in an associated relationship with each other into the content storage section 720.

The operation acceptance section 730 accepts an operation input by the user and supplies an operation signal corresponding to the substance of the accepted operation input to the video-audio outputting control section 740. For example, if a reproduction instruction operation for reproducing a content stored in the content storage section 720 is carried out, then an operation signal representing this is supplied to the video-audio outputting control section 740. On the other hand, if an instruction operation for carrying out editing, working or the like with regard to a content, that is, a stereoscopic image content, stored in the content storage section 720 is carried out, then an operation signal representing this is supplied to the video-audio outputting control section 740.

The content storage section 720 stores various contents under the control of the recording control section 710. For example, the content storage section 720 stores a content wherein video data outputted from the video decoding section 120 and audio data outputted from the audio decoding section 130 are associated with each other under the control of the recording control section 710. Further, the content storage section 720 stores a content of video data and audio data with regard to a stereoscopic image and a stereoscopic image parameter produced by the stereoscopic image parameter production section 150 in an associated relationship with each other. Then, the content storage section 720 supplies a stored content to the video-audio outputting control section 740.

The video-audio outputting control section 740 carries out an outputting process for outputting an image and sound corresponding to a content stored in the content storage section 720 in response to an operation input accepted by the operation acceptance section 730.

In this manner, with the second embodiment of the disclosed technology, video data corresponding to a received broadcasting wave, that is, video data of a stereoscopic image, and a stereoscopic image parameter of the video data can be recorded in an associated relationship with each other. Consequently, the user can view the video data at time favorable to the user and can carry out editing, working and so forth favorable to the user readily using the stereoscopic image parameter of the video data. Further, the user can readily carry out sound control favorable to the user using the stereoscopic image parameter of the video data.

<3. Third Embodiment>

In the first embodiment described hereinabove, a displacement amount of a body included in a stereoscopic image with regard to video data corresponding to a received broadcasting wave is calculated, and a stereoscopic image parameter is produced based on the displacement amount. Here, if the frame packing system is used as the 3D video signal inputting system, then a motion vector between a left eye image and a right eye image which are paired with each other can be used. Therefore, in the third embodiment of the disclosed technology, in the case where the frame packing system is used as the 3D video signal inputting system, a motion vector between a left eye image and a right eye image which are paired with each other is used to produce a stereoscopic image parameter. It is to be noted that the configuration of the information processing apparatus according to the third embodiment is substantially similar to that described hereinabove with reference to FIG. 1. Therefore, the following description is given principally of differences of the third embodiment from the first embodiment.

Here, the frame packing system is described briefly. The frame packing system is one of 3D video signal inputting systems. In the frame packing system, video data of a left eye image and a right eye image paired with each other are coded successively. Further, in the frame packing system, since a motion vector between a left eye image and a right eye image paired with each other is retained, the motion vector can be utilized. In other words, the frame packing system is a transmission system wherein left eye images and right eye images in a compression coded form are transmitted successively on the time axis in a unit of a pair, and a motion vector between a left eye image and a right eye image is associated with the left and right eye images.

Here, it can be supposed that the motion vector between a left eye image and a right eye image has a vertical component of zero but has a horizontal component of a value other than 0, that is, of a non-zero value. Therefore, a displacement amount retaining table of pairs of a left eye image and a right eye image can be produced using a horizontal component of a motion vector of the left eye image and the right eye image.

Example of the Configuration of the Information Processing Apparatus

Figure 14:
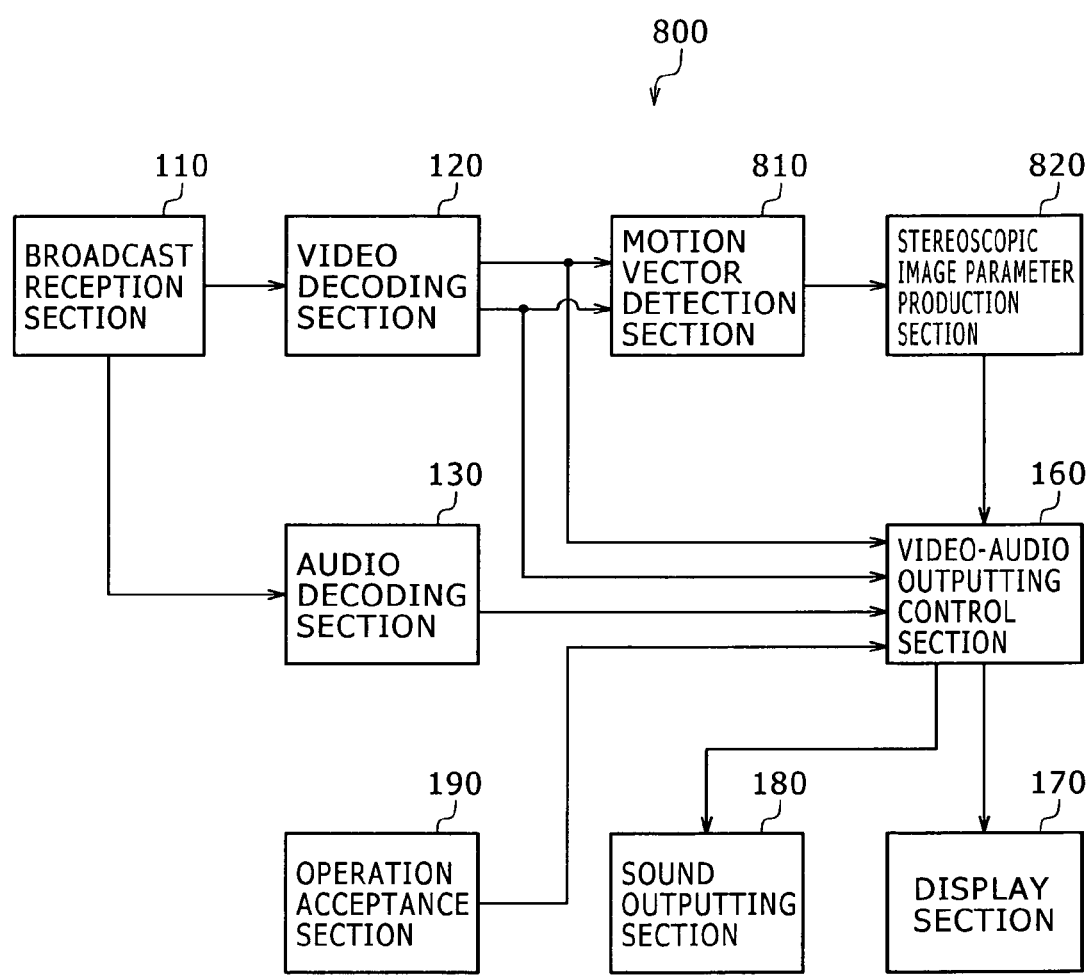
FIG. 14 is a block diagram showing an example of a functional configuration of an information processing apparatus according to a third embodiment of the disclosed technology.

FIG. 14 shows an example of a functional configuration of the information processing apparatus 800 according to the third embodiment of the disclosed technology. Referring to FIG. 14, the information processing apparatus 800 includes a motion vector detection section 810 and a stereoscopic image parameter production section 820 in place of the correlation value calculation section 140 and stereoscopic image parameter production section 150 of the information processing apparatus of FIG. 1. The information processing apparatus 800 is implemented by a television receiver compatible, for example, with the frame packing system.

The broadcast reception section 110 receives broadcasting waves from broadcasting stations, that is, broadcasting waves according to the frame packing system. The video decoding section 120 carries out a decoding process for a video signal outputted from the broadcast reception section 110 to reproduce video data and outputs the reproduced video data to the motion vector detection section 810 and the video-audio outputting control section 160.

The motion vector detection section 810 carries out a motion vector detection process with regard to the video data outputted from the video decoding section 120, that is, to a left eye image and a right eye image, and outputs a result of the detection to the stereoscopic image parameter production section 820.

The stereoscopic image parameter production section 820 produces, based on a result of the detection of a motion vector outputted from the motion vector detection section 810, various parameters, that is, stereoscopic image parameters, with regard to the stereoscopic image which is the detection object. The stereoscopic image parameter production section 820 uses the detection result, that is, the motion vector, outputted from the motion vector detection section 810 to calculate a stereoscopic image parameter which associates a region of a body with regard to which the motion vector is detected and the depth amount of the body. Then, the stereoscopic image parameter production section 820 outputs the produced stereoscopic image parameter to the video-audio outputting control section 160. It is to be noted that the motion vector detection section 810 and the stereoscopic image parameter production section 820 are an example of the production section.

Example of Video Data Ready for the Frame Packing System

Figure 15:
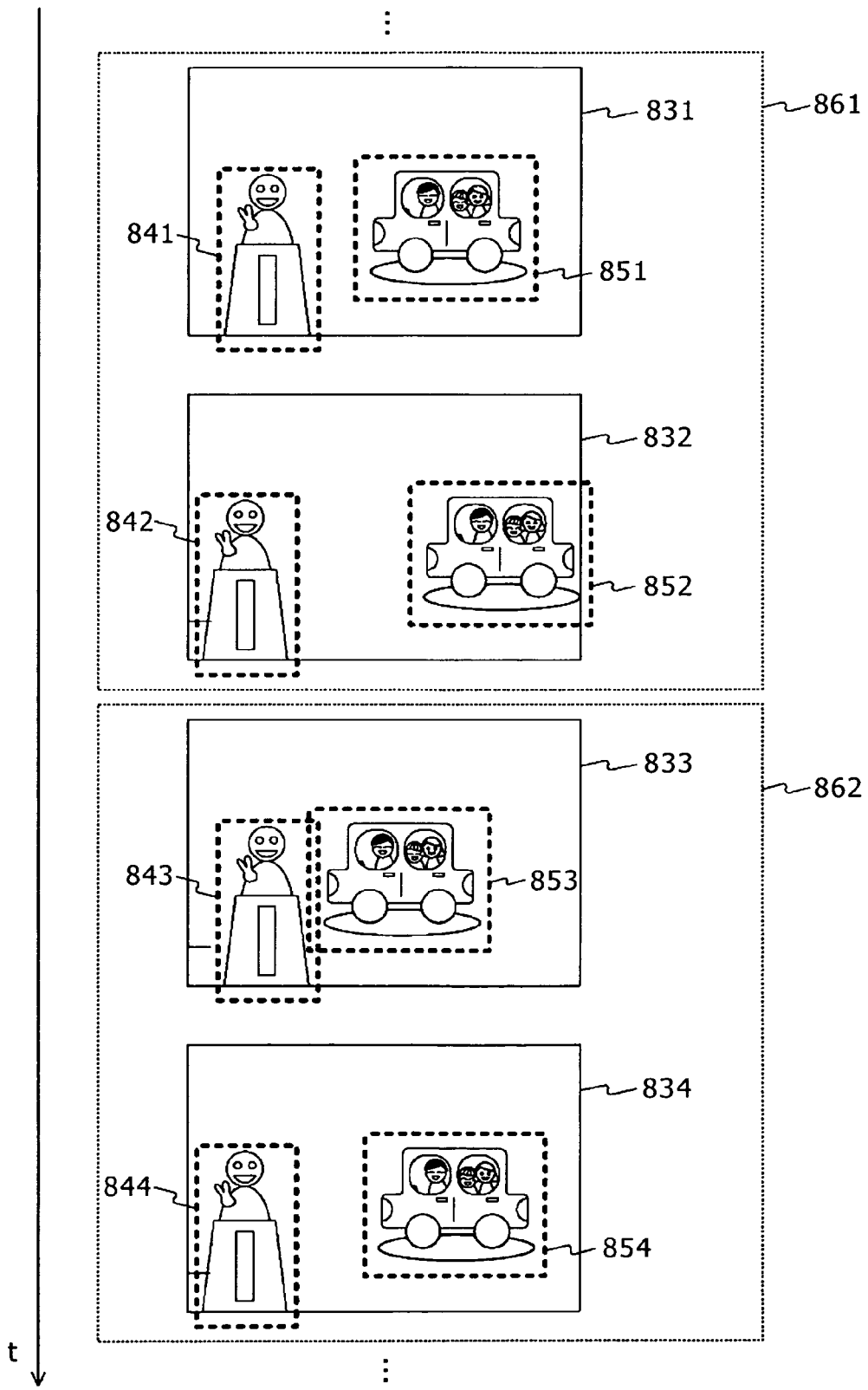
FIG. 15 is a schematic view illustrating an example of video data to be used as an object of motion vector detection by a motion vector detection section shown in FIG. 14.

FIG. 15 illustrates an example of video data which are determined as an object of motion vector detection by the motion vector detection section 810 in the third embodiment.

FIG. 15 particularly illustrates images which successively appear in a time series for individual frames. More particularly, FIG. 15 shows a left eye image 831, a right eye image 832, a left eye image 833 and a right eye image 834. It is to be noted that the left eye image 831 and the right eye image 832 form a pair 861 for displaying a stereoscopic image, and the left eye image 833 and the right eye image 834 form another pair 862 for displaying another stereoscopic image.

Further, each of the left eye image 831, right eye image 832, left eye image 833 and right eye image 834 includes a stereoscopic body in a stationary state which is shown in each of broken line rectangles 841 to 844, and a different stereoscopic body in a moving state which is shown in each of broken line rectangles 851 to 854. It is assumed here that the stereoscopic bodies in a stationary state shown in the broken line rectangles 841 to 844 are positioned on the remote side with respect to the display face while the stereoscopic bodies in a moving state which are shown in the broken line rectangles 851 to 854 are positioned on the near side with respect to the display face.

First, the motion vector detection section 810 detects a motion vector between a left eye image and a right eye image paired with each other. In particular, the motion vector detection section 810 detects a motion vector between the left eye image 831 and the right eye image 832 of the pair 861 and outputs the detected motion vector to the stereoscopic image parameter production section 820. The stereoscopic image parameter production section 820 calculates a horizontal component of the motion vector detected by the motion vector detection section 810, that is, of the motion vector between the left eye image 831 and the right eye image 832 and determines the calculated horizontal component as a displacement amount. Then, the stereoscopic image parameter production section 820 produces a displacement amount retaining table for the pair 861 in which the calculated displacement amount and the block with regard to which the displacement amount is calculated are associated with each other. Also with regard to the pair 862 and so forth, a displacement amount retaining table can be produced for each pair.

Further, the stereoscopic image parameter production section 820 can carry out an edge detection process, a binarization process, a stereoscopic body detection process and so forth using the displacement amount retaining tables similarly as in the first embodiment described hereinabove. Further, the stereoscopic image parameter production section 820 may detect a region of a stereoscopic body or 3D object based on a distribution of the magnitude of the motion vector.

In this manner, with the third embodiment of the disclosed technology, a stereoscopic image parameter can be produced using a motion vector associated with video data corresponding to a received broadcasting wave, which are video data of a stereoscopic image. In this manner, use of a motion vector can reduce the amount of arithmetic operation necessary for production of a stereoscopic image parameter with regard to a stereoscopic image or 3D image in a compression coded form by the frame packing system.

It is to be noted that, in the foregoing description, the embodiments of the disclosed technology are described taking an information processing apparatus which acquires stereoscopic image information corresponding to a broadcasting wave, that is, stereoscopic image information for displaying a stereoscopic image to display a stereoscopic image as an example. However, the embodiments of the disclosed technology can be applied also to an information processing apparatus which acquires stereoscopic image information stored in a recording medium to display a stereoscopic image or an information processing apparatus which acquires stereoscopic image information through a network, which may be a wired line or a wireless channel, to display a stereoscopic image.

The processing step described hereinabove in connection with the embodiments of the disclosed technology may be perceived as a method including the series of steps or may be perceived as a program for causing a computer to execute the series of steps or as a storage medium in which the program is stored. The recording medium may be, for example, a CD (Compact Disc), an MD (Mini Disc), a DVD (Digital Versatile Disk), a memory card, a blu-ray disk (Blu-ray Disc: registered trademark) or the like.

The present disclosure contains subject matter related to that disclosed in Japanese Priority Patent Application JP 2010-232804 filed in the Japan Patent Office on Oct. 15, 2010, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An information processing apparatus, comprising:
   an acquisition section operable to acquire stereoscopic image information, comprising a first image and a second image, for displaying a stereoscopic image; and
   a production section operable to:
   select a first object block on the first image and a second object block, on the second image, corresponding to a position of the first object block on the first image;
   determine a correlation between the first object block and each of a plurality of object blocks on the second image, wherein the plurality of object blocks includes the second object block and one or more object blocks within a predetermined range from the second object block along the horizontal direction of the second image, wherein the predetermined range is determined based on length of a display face of a display device associated with the information processing apparatus; and
   determine a parameter, indicative of a position of a body included in the first object block in the depthwise direction when the stereoscopic image is displayed, based on the determined correlation.

2. The information processing apparatus according to claim 1, wherein said production section determines the correlation to calculate a displacement amount of the body between the first image and the second image, and produces, based on the displacement amount, the parameter which associates a region of the body and a depth amount of the body with each other.

3. The information processing apparatus according to claim 2, wherein said production section calculates, as the depth amount of the body, a protruding amount or a receding amount of the body in a case where the display face of the display device which displays the stereoscopic image is determined as a reference.

4. The information processing apparatus according to claim 2, further comprising a recording control section operable to record the parameter, which associates the region of the body and the depth amount of the body with each other, into or on a recording medium.

5. The information processing apparatus according to claim 1, wherein said production section calculates a displacement amount of the body and retains the calculated displacement amount in an associated relationship with a region of the body in a displacement amount retaining table.

6. The information processing apparatus according to claim 1, wherein said acquisition section receives a broadcasting wave and acquires video data corresponding to the broadcasting wave for displaying the stereoscopic image as the stereoscopic image information.

7. The information processing apparatus according to claim 6, wherein said acquisition section acquires, as the stereoscopic image information, the video data of a frame packing system which is a transmission system, wherein the first image and the second image which are in a compression coded form are transmitted successively on a time axis in a unit of a pair, and wherein said production section determines the parameter using a horizontal component of a motion vector between the first image and the second image.

8. The information processing apparatus according to claim 1, wherein the parameter is used to adjust the position of the body in the depthwise direction.

9. The information processing apparatus according to claim 1, wherein the parameter is used to adjust sound to be emitted from the body.

10. The information processing apparatus according to claim 1, further comprising a recording control section operable to cause the determined parameter and the acquired stereoscopic image information to be recorded in an associated relationship with each other on or into a recording medium.

11. An information processing apparatus, comprising:
an acquisition section operable to acquire video data including a first image and a second image for displaying a stereoscopic image, the video data being of a frame packing system which is a transmission system, wherein the first image and the second image in a coded form are transmitted successively on a time axis in a unit of a pair; and
a production section operable to:
   select a first object block on the first image and a second object block, on the second image, corresponding to a position of the first object block on the first image;
   determine a correlation between the first object block and each of a plurality of object blocks on the second image, wherein the plurality of object blocks includes the second object block and one or more object blocks within a predetermined range from the second object block along the horizontal direction of the second image, wherein the predetermined range is determined based on length of a display face of a display device associated with the information processing apparatus; and
   determine a parameter, indicative of a position of a body included in the first object block in the depthwise direction, based on the determined correlation.

12. An information processing method, comprising:
acquiring stereoscopic image information, comprising a first image and a second image, for displaying a stereoscopic image;
selecting a first object block on the first image and a second object block, on the second image, corresponding to a position of the first object block on the first image;
determining a correlation between the first object block and each of a plurality of object blocks on the second image, wherein the plurality of object blocks includes the second object block and one or more object blocks within a predetermined range from the second object block along the horizontal direction of the second image, wherein the predetermined range is determined based on length of a display face of a display device which displays the stereoscopic image; and
determining a parameter, indicative of a position of each of one or more bodies included in the first object block in the depthwise direction when the stereoscopic image is displayed, based on the determined correlation.

13. A non-transitory computer readable storage medium having stored thereon, a computer program having at least one code section executable by a computer, thereby causing the computer to perform the steps comprising:
acquiring stereoscopic image information, comprising a first image and a second image, for displaying a stereoscopic image;
selecting a first object block on the first image and a second object block, on the second image, corresponding to a position of the first object block on the first image;
determining a correlation between the first object block and each of a plurality of object blocks on the second image, wherein the plurality of object blocks includes the second object block and one or more object blocks within a predetermined range from the second object block along the horizontal direction of the second image, wherein the predetermined range is determined based on length of a display face of a display device which displays the stereoscopic image; and
determining a parameter, indicative of a position of each of one or more bodies included in the first object block in the depthwise direction when the stereoscopic image is displayed, based on the determined correlation.

14. The information processing apparatus according to claim 1, wherein the one or more object blocks correspond to blocks formed by shifting the second object block by a predetermined number of pixels along the horizontal direction of the second image within the predetermined range.

15. The information processing apparatus according to claim 1, wherein the production section is further operable to determine a greatest value of correlation determined with regard to each of the plurality of object blocks on the second image.

16. The information processing apparatus according to claim 15, wherein the parameter indicative of the position of the body included in the first object block is determined corresponding to the greatest value of correlation.

17. The information processing apparatus according to claim 1, wherein the predetermined range is at least five percent of the length of the display face.

18. The information processing apparatus according to claim 1, wherein the parameter is stored in an associated relationship with the first object block in a displacement amount retaining table, wherein the body is detected to be watched stereoscopically based on the displacement amount retaining table.

* * * * *